(12) United States Patent
Kollmuss et al.

(10) Patent No.: US 10,654,662 B2
(45) Date of Patent: May 19, 2020

(54) METHOD AND APPARATUS FOR HANDLING PIECE GOODS MOVED ONE AFTER ANOTHER

(71) Applicant: KRONES Aktiengesellschaft, Neutraubling (DE)

(72) Inventors: Manuel Kollmuss, Raubling (DE); Erhard Beer, Ebbs (AT); Michael Astner, Brannenburg (DE); Arsalan Mehdi, Rosenheim (DE)

(73) Assignee: Krones Aktiengesellschaft, Neutraubling (DE)

( * ) Notice: Subject to any disclaimer, the term of this patent is extended or adjusted under 35 U.S.C. 154(b) by 0 days.

(21) Appl. No.: 16/093,248

(22) PCT Filed: Feb. 21, 2017

(86) PCT No.: PCT/EP2017/053838
§ 371 (c)(1),
(2) Date: Oct. 12, 2018

(87) PCT Pub. No.: WO2017/182162
PCT Pub. Date: Oct. 26, 2017

(65) Prior Publication Data
US 2019/0062071 A1 Feb. 28, 2019

(30) Foreign Application Priority Data
Apr. 20, 2016 (DE) ........................ 10 2016 206 650

(51) Int. Cl.
  B65G 47/08 (2006.01)
  B65G 47/244 (2006.01)
(52) U.S. Cl.
  CPC ......... B65G 47/086 (2013.01); B65G 47/244 (2013.01)

(58) Field of Classification Search
None
See application file for complete search history.

(56) References Cited

U.S. PATENT DOCUMENTS

| 4,641,271 A * | 2/1987 | Konishi ............. G05B 19/4182 414/273 |
| 5,123,231 A | 6/1992 | Fallas et al. |

(Continued)

FOREIGN PATENT DOCUMENTS

| CN | 103787059 A | 5/2014 |
| DE | 102009043970 | 3/2011 |

(Continued)

OTHER PUBLICATIONS

PCT Application: PCT/EP2017/053838 filed Feb. 21, 2017—International Preliminary Report on Patentability dated Oct. 23, 2018.

(Continued)

*Primary Examiner* — William R Harp
(74) *Attorney, Agent, or Firm* — Simmons Perrine Moyer Bergman PLC

(57) ABSTRACT

The invention relates to a method and an apparatus (10) for handling piece goods (2) moved one after another, with the piece goods (2) being transported to a seizing range (4) of a manipulator (5). At least one transported piece good (2) is seized in a clamping and/or force-locking and/or form-locking manner by at least two clamping elements and/or gripping elements (22) located opposite each other. The piece good is spatially separated from the subsequent piece goods (2) and is brought into a specified relative target position (P) and/or target alignment relative to subsequent piece goods (2). A first vertical symmetry plane and which is oriented about perpendicular to a transport direction (TR), is spaced apart from a second vertical symmetry plane aligned about parallel thereto, with the second vertical (Continued)

symmetry plane being defined by the manipulator (5) or by the manipulator clamping elements and/or gripping elements (22).

19 Claims, 9 Drawing Sheets

(56) References Cited

U.S. PATENT DOCUMENTS

| | | | | |
|---|---|---|---|---|
| 7,643,901 | B2* | 1/2010 | Ponti | B65G 47/086 |
| | | | | 700/217 |
| 8,147,177 | B2* | 4/2012 | Huber | B65G 47/086 |
| | | | | 198/461.1 |
| 8,392,017 | B2* | 3/2013 | Trygg | B65G 57/24 |
| | | | | 414/791.4 |
| 8,448,411 | B2 | 5/2013 | Huber et al. | |
| 9,387,992 | B2* | 7/2016 | Boschi | B25J 15/0052 |
| 9,475,660 | B2* | 10/2016 | Batrin | B65G 47/086 |
| 9,505,139 | B2 | 11/2016 | De Bie | |
| 2005/0246056 | A1 | 11/2005 | Marks et al. | |
| 2009/0028686 | A1* | 1/2009 | Tallis | B65G 61/00 |
| | | | | 414/793.4 |
| 2016/0280475 | A1* | 9/2016 | Kollmuss | B65G 57/03 |

FOREIGN PATENT DOCUMENTS

| | | |
|---|---|---|
| DE | 102010020847 | 11/2011 |
| DE | 102011080812 | 2/2013 |
| DE | 102011087052 | 5/2013 |
| DE | 102013204095 | 9/2014 |
| DE | 102013106004 | 12/2014 |
| EP | 1456101 | 9/2004 |
| EP | 1927559 | 6/2008 |
| EP | 2107018 | 10/2009 |
| EP | 2246277 | 11/2010 |
| EP | 2662293 | 11/2013 |
| EP | 2662319 | 11/2013 |
| FR | 2993870 | 1/2014 |
| JP | H052843 | 1/1993 |
| WO | 2010106529 | 9/2010 |
| WO | 2014145412 | 9/2014 |

OTHER PUBLICATIONS

Priority Application: DE 10 2016 206 650.1—Filed: Apr. 20, 2016—German Search Report dated Apr. 18, 2017.

PCT Application: PCT/EP2017/053838—Filed: Feb. 21, 2017—International Search Report dated May 18, 2017.

* cited by examiner

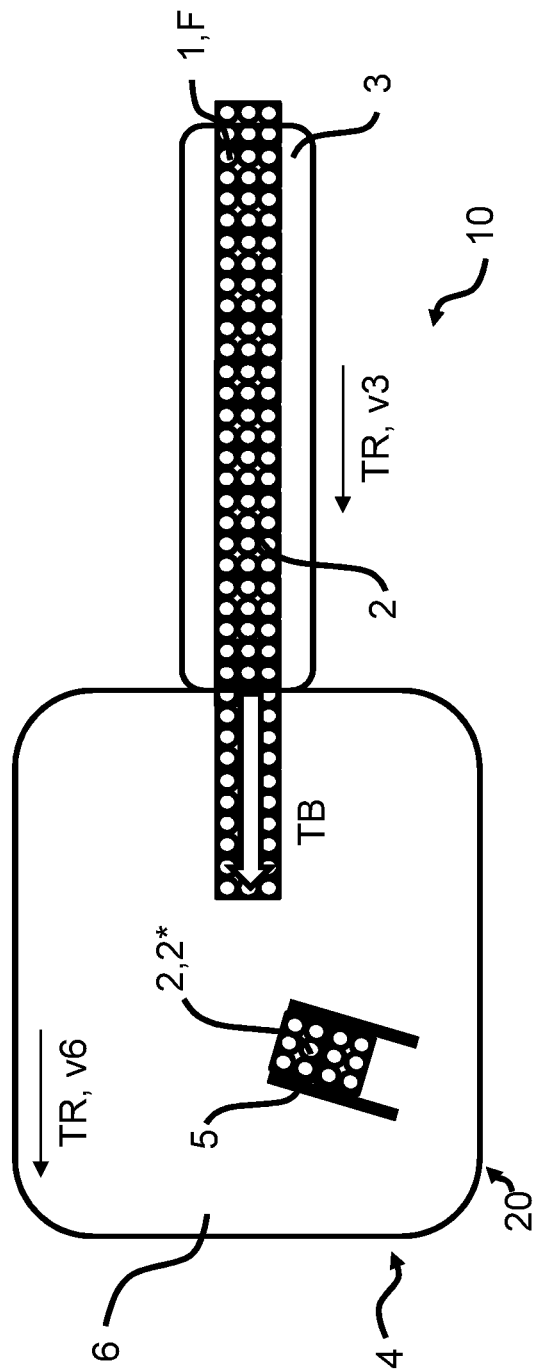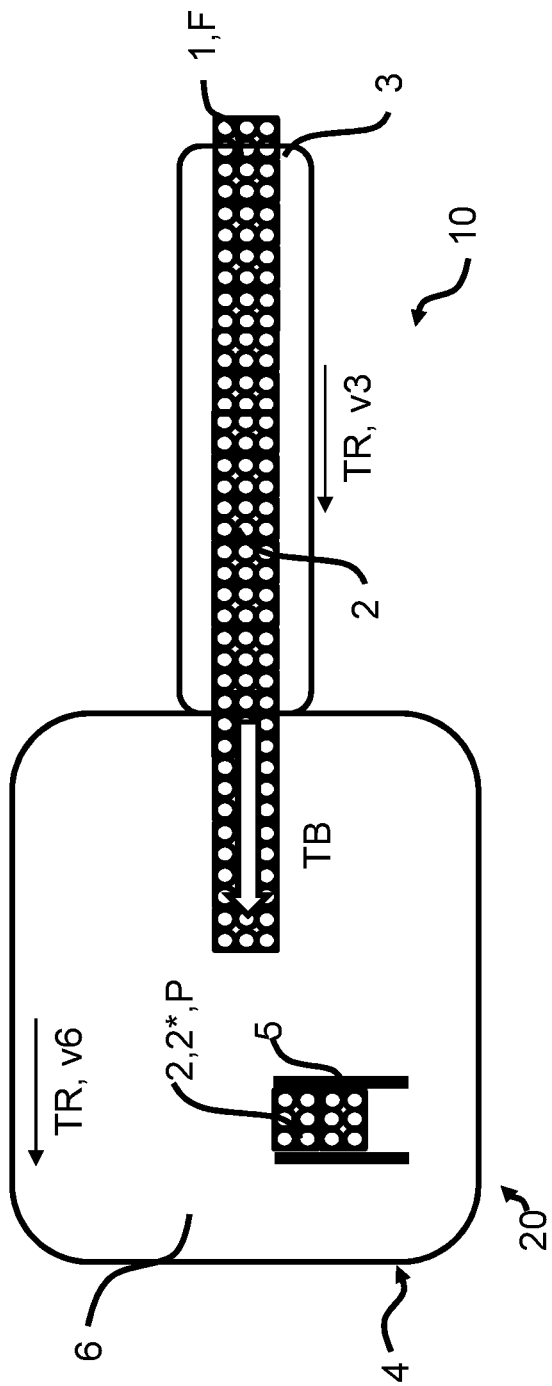

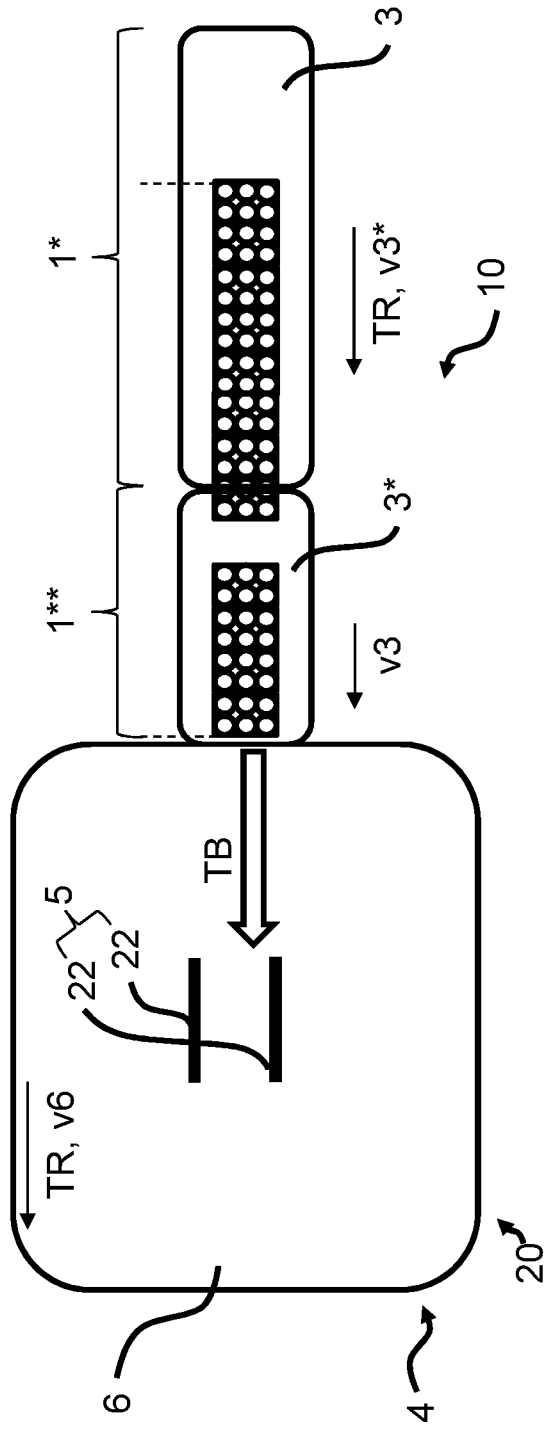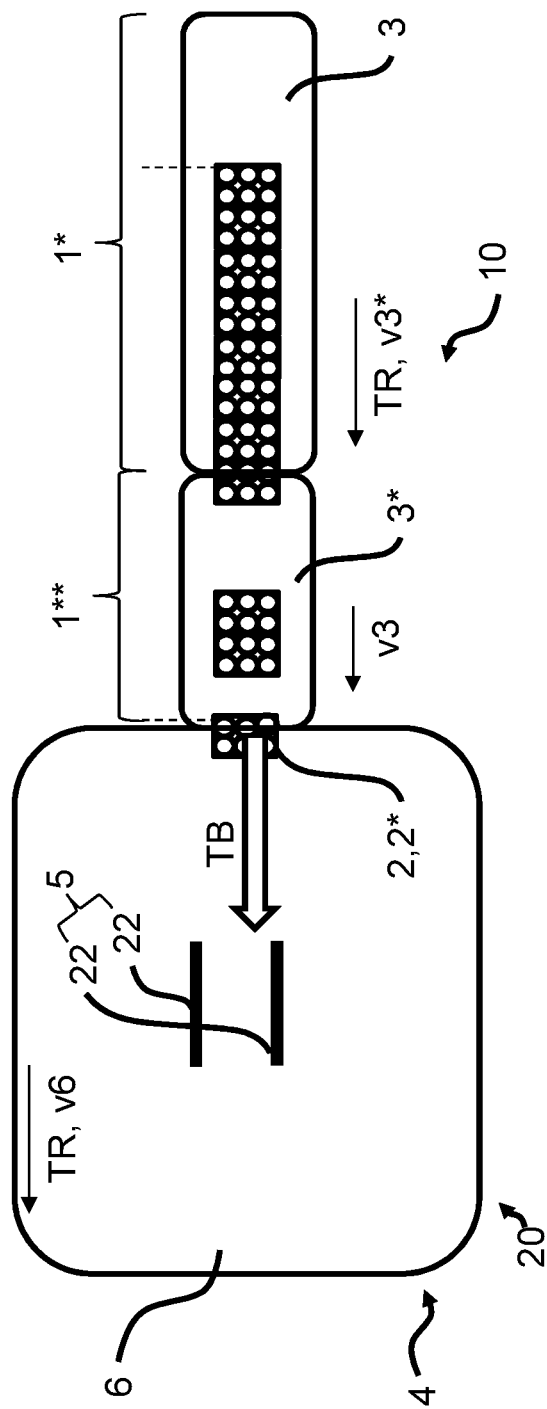

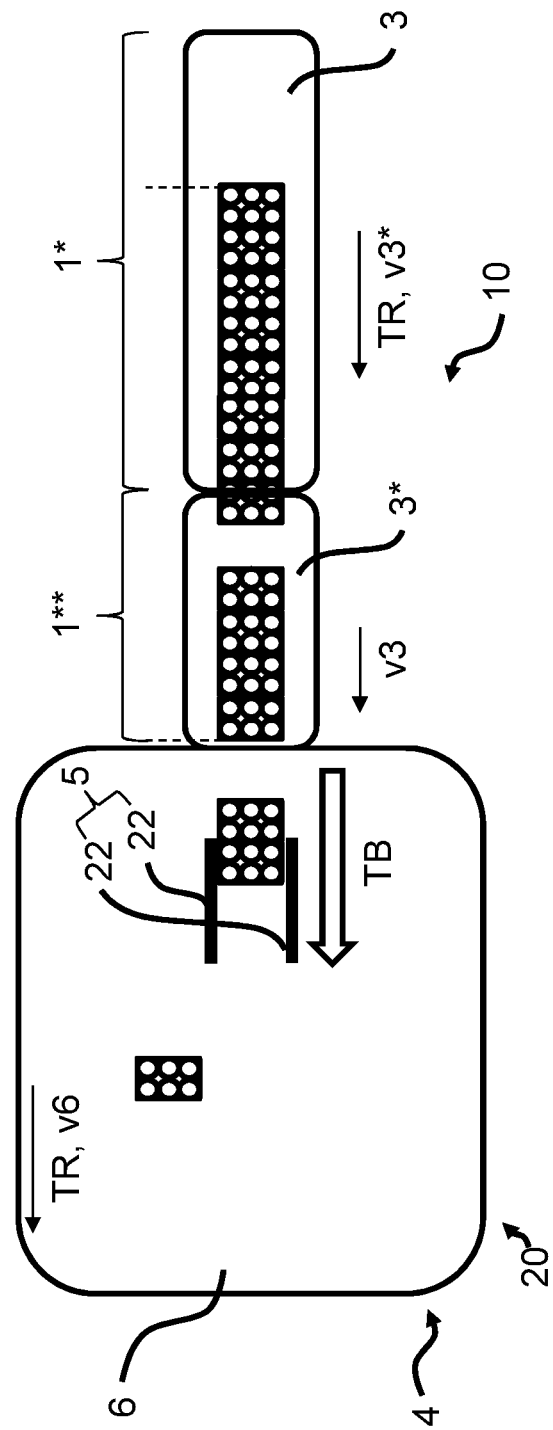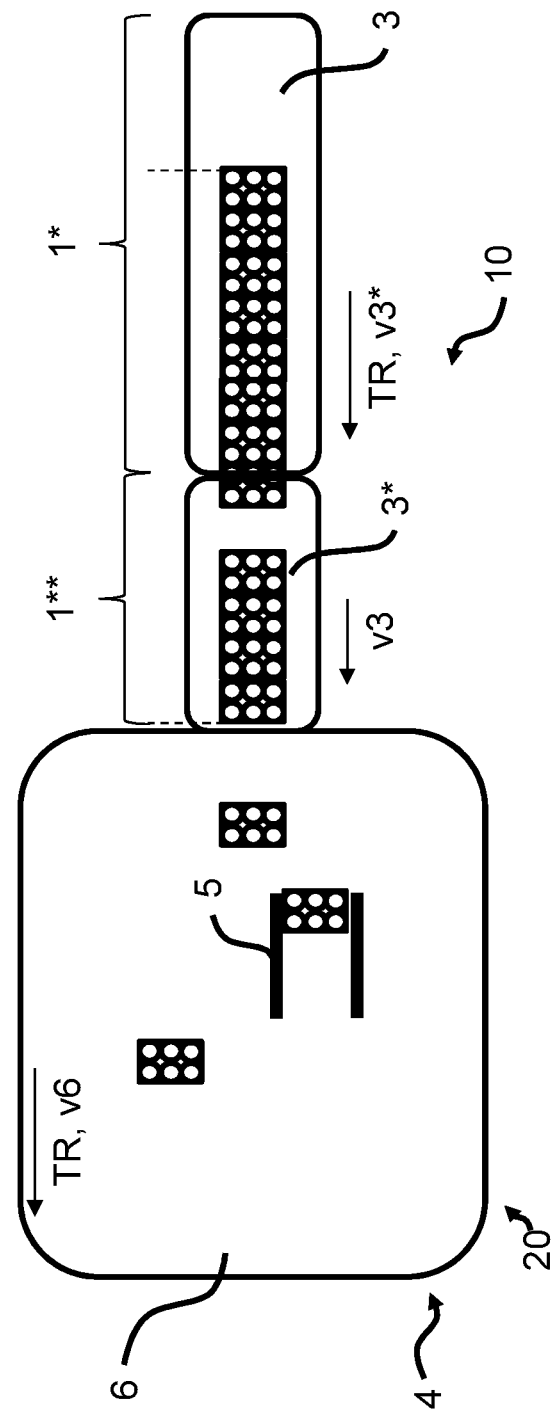

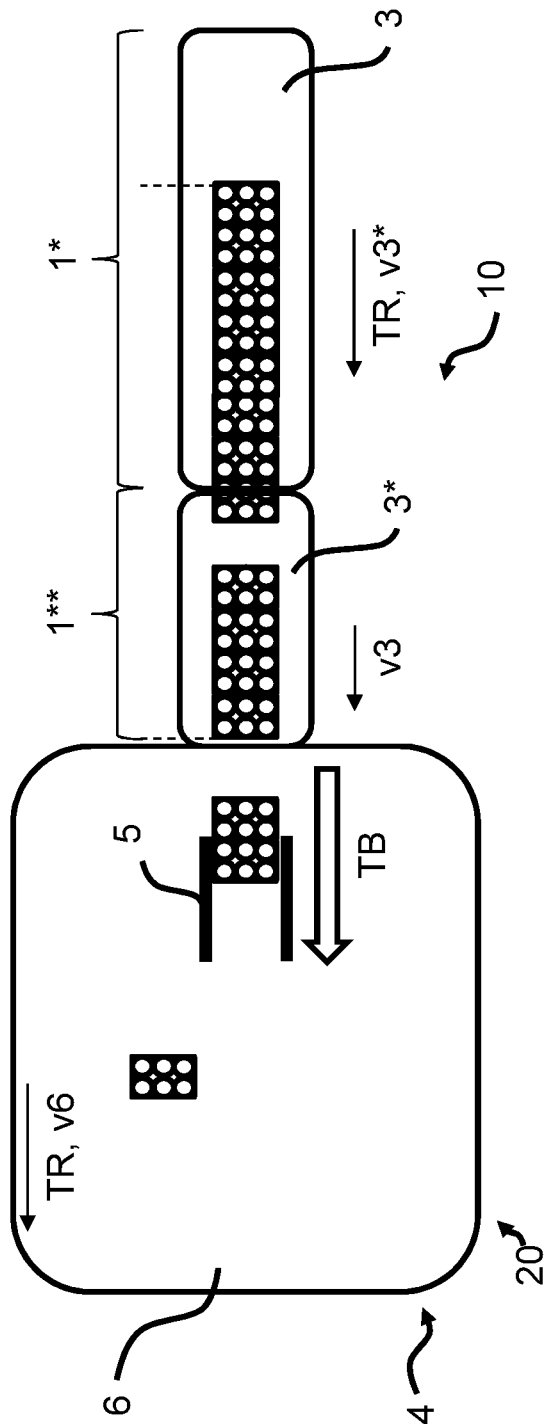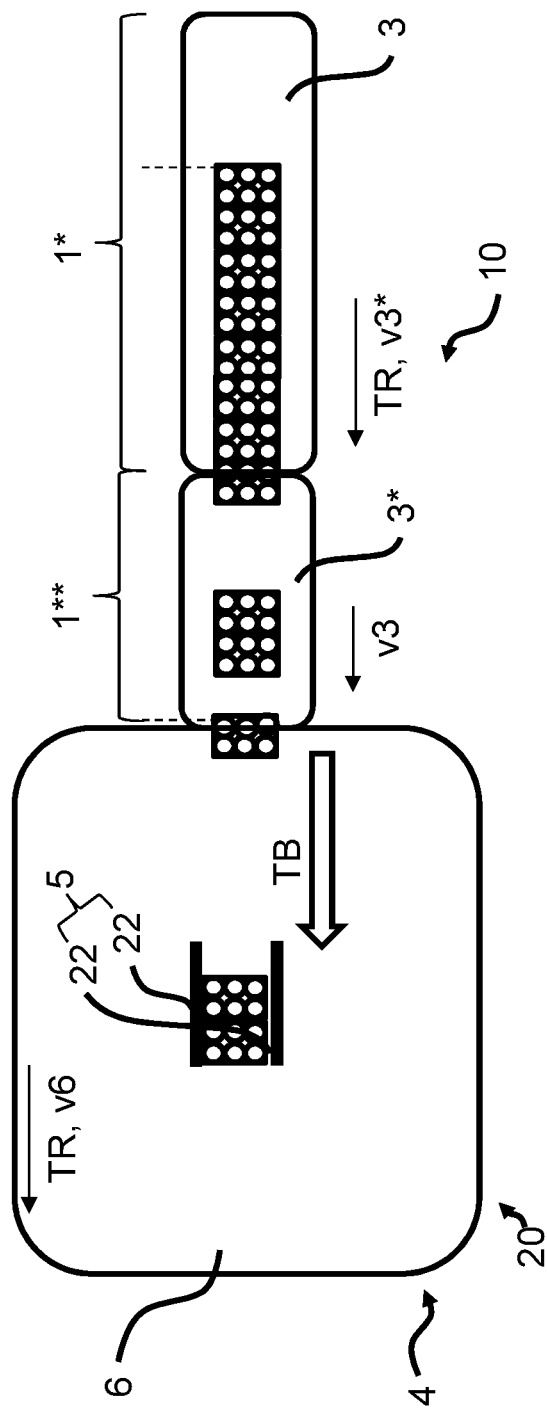

METHOD AND APPARATUS FOR HANDLING PIECE GOODS MOVED ONE AFTER ANOTHER

CLAIM OF PRIORITY

The present application claims priority to International Application PCT/EP2017/053838, filed Feb. 21, 2018, which claim priority to German Application DE 10 2016 206 650.1, filed Apr. 20, 2016, all of which are incorporated by reference.

FIELD OF THE INVENTION

The present invention relates to a method for handling piece goods moved one after another. The invention moreover relates to an apparatus for handling piece goods moved one after another.

BACKGROUND OF THE INVENTION

In the known methods for packaging and/or palletizing piece goods, such as packages, bundles, or the like, these are first conveyed on transport devices conveying in lines, and are shifted, aligned, and/or assembled in a suitable manner for producing desired layer patterns that can be subsequently stacked in multiple layers on top of each other, for example on pallets prepared for this purpose. These treatment steps can be particularly useful in facilities for treating beverage containers. The piece goods in question can be, for example, packages, crates, cartons, bundles, or clusters. For the mentioned pallets to be safe for transport, the assembled layer patterns, which are also referred to as assembled cycles, have to meet certain requirements. In order to form such cycles, it is customarily necessary to perform preparatory procedures, which consist, for instance, in first conveying piece goods regularly or stepwise on a so-called dosing belt, in then grouping or gathering them on an intermediate transport belt, and in delivering them together and/or in groups from there to a layer-forming belt or a layer-forming table.

In the prior art it is known to deliver spaced-apart piece goods from a dosing belt onto a transport belt, which means that in each instance individual piece goods are delivered to the transport belt. This delivery can be carried out by each individual piece good being individually delivered onto the transport belt by way of a velocity difference between dosing belt and transport belt; a control by optical sensors, for example light barriers, can additionally be in place. It is likewise conceivable to deliver the piece goods in a spaced-apart manner from the transport belt by way of operating the layer-forming belt in a stepwise manner. In order to deliver in each instance individual piece goods from the transport belt onto the layer-forming belt in such a manner, the layer-forming belt can be operated in steps that are synchronized with the transport belt by exactly one length of a piece good in transport direction. These cycles or groups or parts of grouped piece goods can also be rotated on the transport belt according to the desired layer pattern in order to then be delivered to the layer-forming belt.

Prior art knows different embodiment variants for designing grouping tables that serve to bring together piece goods, such as cartons, shrink packs, trays, and plastic crates. Piece goods can be brought together by being assembled into a two-dimensional formation (block construction, e.g. pallet layer), for example. For this purpose, a roller conveyor, for instance, can be supplied linearly from one or several lanes. According to requirements, the piece goods can be rotated prior to or on the roller conveyor, and they can be arranged in the required positions mechanically by stop points. The piece goods positioned in such a way can then be pushed off from the roller conveyor in a direction orthogonal to the transport direction. Supplying, arranging, and pushing off the piece goods can in this context be regarded as a cycle. At least one cycle is needed to assemble one layer, normally, however, a plurality of cycles are needed. The partly discontinuous conveyance with its relatively abrupt speed changes or direction changes causes accordingly high mechanical stress on the piece goods, which is possibly detrimental to product-protective processing of the piece goods.

Document EP 1 456 101 A2 discloses an apparatus for forming rows from packaging goods for bundle palletizers. The bundle palletizer comprises at least one layer station and at least one palletizing station. The row forming apparatus comprises at least one positioning station, on which the packaging goods are arranged at desired spaces in at least one row during the transport. The positioning station connects to a staging conveyor associated with the layer station. At least one accumulating conveyor is disposed upstream from the positioning station, which has several conveyor sections arranged consecutively in transport direction with controllable and regulatable drives. The controllable and regulatable drives make it possible to achieve the desired spacing for the packaging goods. The row forming apparatus has at least one monitoring device for identifying and monitoring the spacing of the packaging goods. The construction of this known row forming apparatus is rather elaborate and complicated, especially since many belts are required for forming the spaces and/or for rotating the packaging goods.

An apparatus is known from U.S. Pat. No. 5,123,231 A for assembling articles into groups and subsequently packaging them. On a feeder belt and in each instance with a predefined space, the articles are fed to a collection belt where the groups are assembled from an unvarying number of articles. The groups are then fed to a subsequent belt of a packaging device.

EP 1 927 559 A1 discloses a grouping table for bringing together bundles, in particular shrink packs, for the purpose of forming layers, the grouping table comprising a continuously drivable conveyor, disposed downstream therefrom a cyclically drivable step conveyor, disposed laterally next thereto a layer-forming station, and a push-off device associated with the step conveyor and acting orthogonal to the conveying direction for the groupwise transfer of the bundles onto the layer-forming station.

US 2005/0246056 A1 discloses a system for arranging packaging items into a layer that is deposited or stacked on a pallet in following handling procedures. The system involves three linearly arranged conveyor belts. Via a first conveyor belt, the packaging items are supplied to the apparatus. The packaging items are disposed linearly on the first conveyor belt. With the second conveyor belt, the packaging items are spaced apart. Subsequently, the packaging items reach a third conveyor belt, where the arrangement of the packaging items is carried out. All three conveyor belts run at different, however, in each instance constant speeds. When a layer is completely assembled, it is transferred onto the pallet.

The known prior art as illustrated by different documents can have various disadvantages in practice. The particular velocity differences and high acceleration ramps and/or correspondingly steep deceleration ramps involve the risk that spacing apart or transferring the piece goods between dosing belt, transport belt, and also layer-forming belt cannot be carried out in the intended precise manner. Individual piece goods may even veer off or turn or rotate away from their specified positions. Moreover, the frictional resistance between the particular conveyor belt or transport belt and the underside of the particular piece good also plays a role that is not to be neglected, as it can lead to the spaces between the cycles not being precisely reproducible and thus turning out different. In addition, the distance that the individual spaces need to cover for the so-called procedure of cycling-in from the dosing belt onto the transport belt can result in loss of performance. All of these effects increase the time required for putting together a pallet.

In order to avoid these disadvantages, EP 2 107 018 A1 proposes a method and an apparatus intended for staging cycles of bundles and/or bundle groups safely, quickly, and at top quality, so that the rows for the layers of a pallet can be put together in an effective manner. The proposed apparatus serves for assembling and aligning bundle groups, and it comprises a dosing belt, a transport belt, and a belt for forming rows or layers. The dosing belt, the transport belt, and the belt for forming rows or layers are each provided with an own motor as a drive. The speed of the dosing belt is regulated by a control such that the bundles or bundle groups being transported one batch next to the other can be divided into a number of cycles of bundles or bundle groups on the transport belt. Predefined spaces are formed between the individual cycles. The belt for forming rows or layers can have a robot associated with it, which can shift and/or rotate the incoming cycles from the transport belt to form layers in or transversely to transport direction. In addition, the layer-forming belt is intended to enable the formation of a layer made from a plurality of rows.

Furthermore, a method for forming palletizable layers from piece goods standing next to each other on a layer-forming station is known from DE 10 2011 080 812 A1. Associated with the layer-forming station is a program-controlled manipulator for collecting and/or transferring individual or several piece goods from at least two feed stations that are spatially apart or offset from one another and for positioning the piece goods by rotating and/or shifting them into specifiable release positions on the layer-forming station.

Manipulators of this type or also robots associated with the layer-forming belts can be designed as multi-axis robots, for example, such as are known from DE 10 2009 026 220 A1, for instance, in the context of grouping articles or beverage containers. A frequently used variant of suchlike manipulators are so-called gantry robots, which are often employed in a modular structure in packaging lines, in grouping units, or in palletizing stations. A conveyor belt extending horizontally in longitudinal direction of the conveying level, or a different endlessly circulating means, are types of frequently used transport means or conveying units, on which the objects and/or packages are disposed in predetermined or in randomly assumed positions. Such a module is known, for example, from DE 10 2009 043 970 A1. The gantry robots that are typically employed in such modules, as known, for instance, from DE 10 2010 020 847 A1, can be equipped with gripping apparatuses, for example, for lateral seizing of the piece goods to be handled or manipulated.

It is the primary object of all known handling systems to enable precise positioning of piece goods, packages, bundles, and/or articles for, as far as possible, failure-free and reliable preparation for layer forming, palletizing, and/or packaging. A secondary object that is, however, becoming increasingly important, lies in reducing the cycle times in this process without reducing the already achieved degree of precision and without having to accept decreases in terms of the reliability already achieved. The method is intended to enable processing of piece goods that are conveyed or transported in at least one row. The method is moreover intended to run at a higher speed than has been hitherto possible without creating disadvantages in terms of piece good positioning precision and/or manipulation reliability. The corresponding apparatus is intended to operate faster than the manipulation apparatuses known from prior art and at the same time with at least approximately the same reliability and approximately the same positioning precision.

These objects of the invention are achieved by the subject matter of the independent claims, that is, by a method and an apparatus for handling piece goods moved one after another, the method and the apparatus comprising the features of the independent claims. Features of advantageous further developments of the invention are indicated in the relevant dependent claims.

SUMMARY OF THE INVENTION

The invention relates to a method and an apparatus for treating and/or handling piece goods that can be moved one after another, in particular, in at least one row, with the piece goods in any case being moved one after another, optionally with consecutive piece goods equally or differently spaced apart, or optionally also with immediately consecutive and in each instance unspaced piece goods. Independently of the sequence of the piece goods transported one after another, they are normally transported aligned one after another. The piece goods transported one after another can be optionally transported in a cycled manner, for example, in consecutive rows each of a plurality of piece goods, etc. If therefore simply a "method", a "method variant", the "method according to the invention" or the like is referred to in the context of the present description, this is intended to generally mean the mentioned method for handling piece goods being moved one after another in at least one row and/or one after another in a cycled manner and/or differently spaced apart. If, furthermore, simply an "apparatus", an "apparatus variant", the "apparatus according to the invention" or the like is referred to in the context of the present description, this is intended to generally mean the mentioned apparatus for handling piece goods moved one after another. If "handling of piece goods" is mainly referred to here, in the exemplary embodiments, in the claims, and/or in the context of the entire description disclosure, this is intended to likewise comprise handling, seizing, positioning, moving in the space, rotating, aligning, etc., in particular in the context of a manipulator and/or movable parts of the manipulator that is, or that are disposed in a seizing space and that can move therewithin definable limits. The term of handling, however, likewise comprises positioning steps, conveying steps, and/or any types of handling steps that can take place in the context of conveying devices, horizontal conveying devices, transport belts, etc. that are part of the apparatus according to the invention and/or are in operative connection and/or in a transport connection therewith, be they parts that are arranged downstream or upstream in transport direction and/or conveying direction, or be they integrated parts of the apparatus according to the invention.

The piece goods can be articles, packaging items, container sets, bundles, cartons, or the like, that are moved one after another. It can be provided, for example, that a plurality of piece goods or of articles of the same or of different kinds are gathered together in a bundle or in a mixed bundle by an external cardboard packaging, by a strapping or by a plurality of strappings, by a film packaging, or the like. Furthermore, a plurality of beverage containers held together, for example, by a shrink wrap, by a strapping tape or a plurality of strapping tapes, can in each instance form one piece good. The piece goods moved one after another can in this context be formed to be the same or to be different, according to requirements of subsequent handling apparatuses.

The at least two immediately consecutive piece goods being moved, for example, in a row without spaces or with minimal spaces or also larger and/or variable spaces, and/or being conveyed to an area—referred to, in particular, as manipulating range or seizing range—can be transported as a closed formation, for example. The term "closed formation" can be intended to primarily mean a largely unspaced succession of piece goods transported one after another. The closed formation in the sense of the present invention can be of finite length and comprise a limited number of piece goods, whereupon a space can follow, and upon such a space another such formation can follow which is subsequently transported. Such a sequence can be repeated a plurality or a multitude or an undefined number of times, too, if required. The closed formation can also be transported as an endless formation that has no interruption and comprises an optional number of piece goods. At least one transported piece good is seized in a clamping and/or force-locking and/or form-locking manner from this formation or closed formation; is spatially separated from the formation; and is brought into a specified relative target position and/or target alignment in relation to subsequent piece goods of the formation.

However, in deviation herefrom, the piece goods can also be conveyed to the manipulator or to the manipulator seizing space in cycled infeed, which can mean both the supply in rows with in each instance specified spaces of the piece goods to each other and/or rows of finite length with in each instance larger spaces between such consecutive rows. A closed formation in this sense can also be understood as a longer sequence of a plurality of such rows, which—although this does thus not imply an unspaced succession of piece goods—can, due to the regular transport with regularly repeating patterns of consecutively transported piece goods and their particular spaces from each other, in the entirety nevertheless be likewise regarded as a closed formation in the broadest sense. Such a described transport sequence of piece goods, however, comes closer to a cycled supply or to the term of a cycled infeed than to a strictly unspaced succession of piece goods. Such a cycled sequence can be repeated a plurality or a multitude or an undefined number of times, too, if required. The cycled formation can also be transported as an endless formation that has no interruption and that comprises an optional number of piece goods. At least one transported piece good is seized within the seizing range by the manipulator in a clamping and/or force-locking and/or form-locking manner from this quasi-closed formation or from this cycled infeed; is spatially separated from the formation; and is brought into a specified relative target position and/or target alignment in relation to subsequent piece goods of the formation.

If "seizing" of piece goods in a "clamping manner" is referred to in the context of the present invention, this is intended to likewise comprise seizing, gripping, or receiving piece goods in a force-locking and/or friction-locking manner. All the variants of receiving, seizing, and/or gripping piece goods can be likewise combined with seizing, gripping, or receiving the piece goods in a form-locking manner. If a "target position" and/or "target alignment" is referred to in the context of the present invention, this is intended to mean, in particular, that the piece goods can be seized, shifted, and/or rotated; and it is also possible that the piece goods can be optionally only shifted (without rotation) or only rotated (without shifting movement).

In the method and the apparatus according to the invention, it can furthermore be provided that at least one first vertical symmetry plane defined by the piece good seized by the at least two clamping elements and/or gripping elements of the at least one manipulator is spaced apart from a second vertical symmetry plane that is defined by the manipulator or by the manipulator clamping elements and/or gripping elements; and in the present context, this is also referred to, or can be referred to, as so-called asynchronous picking off. Within the method, that is to say, between two or more method steps, there is one variant that can possibly occur repeatedly or be useful, where these mentioned symmetry planes coincide or nearly coincide. This non-synchronous picking off is, however, usually not separately mentioned, because the complete loading and/or symmetric loading of the manipulator with a plurality of piece goods represents the normal case, to which most of the method aspects outlined in the context of the present description apply.

With the so-called asynchronous loading or with the so-called asynchronous seizing of piece goods or of at least one piece good it can be defined, in particular, that the one piece good seized by the manipulator is not seized and positioned centrally or symmetrically in relation to the vertical central axis and/or axis of rotation of the manipulator or of the manipulator clamping elements and/or gripping elements while it is being shifted and/or brought toward the target position, if applicable, under simultaneous rotation. This applies likewise to two or more seized piece goods, which, in conjunction, can also be clamped in the manipulator eccentrically or asymmetrically.

If "vertical symmetry planes" is referred to in the present context, relating mainly to the positions of the piece goods or to their relative positions to the manipulator or to the manipulator clamping elements and/or gripping elements these vertical symmetry planes are intended to be understood, according to the definition, as oriented perpendicular or approximately perpendicular to the horizontal conveying plane. These symmetry planes, that is to say, the first symmetry plane, the second, and, if applicable, further symmetry planes, are expediently also oriented perpendicular to the horizontally extending transport direction and/or about perpendicular to a longitudinal extension direction of the formation or of the closed formation. If the reader imagines this transport direction as a horizontal vector arrow extending parallel to the horizontal support surface of the horizontal conveying device as well as parallel to the transport device that normally likewise extends horizontally or in sections horizontally, then this vector arrow pierces the perpendicular symmetry planes that are likewise essentially in perpendicular. As mentioned, these at least two symmetry planes—one is associated with the piece goods, the other with the manipulator—are located at a certain distance from one another if the manipulator is loaded asymmetrically or one-sided. If the symmetry planes coincide or approximately coincide, this represents the special case of the completely loaded and/or symmetrically loaded or centrally loaded manipulator.

It should be added at this point that the piece goods with which the mentioned first vertical symmetry plane is associated can in particular be the particular entirety of piece goods that are located in the manipulator or between the two manipulator clamping jaws in the particular, relevant operating cycle. The entirety of piece goods can thus be characterized, if applicable and appropriate in the individual case, by the total volume and/or the mass point of the total of piece goods located in the manipulator and seized by the manipulator. Accordingly, the second vertical symmetry plane associated with the manipulator expediently is the symmetry plane that extends through the center point of the entirety of piece goods when the manipulator is completely loaded or when it is loaded according to its maximum seizing capacity which normally also implies a central, symmetric, and/or even loading with piece goods. If a "center point of the entirety of piece goods" is referred to in the context of the location of the second vertical symmetry plane, then, according to the design of the piece goods, this can be, for example, the mass point of the entirety of piece goods seized in the manipulator, or it can be the volumetric center point of this entirety of piece goods.

It should be added that the second symmetry plane associated with the manipulator can likewise be associated with the manipulator clamping jaws that can be advanced toward each other, such that a central or an eccentric arrangement of the piece goods or of the particular entirety of piece goods seized simultaneously between the clamping jaws, can be referred to if the first symmetry plane associated with the piece goods or with the entirety of in each instance seized piece goods, coincides with the second symmetry plane or is spaced apart therefrom.

Relating to all of the previously mentioned variants of symmetric or asymmetric arrangement of the piece goods and/or of the synchronous or asynchronous loading of the manipulator with piece goods, it should additionally be noted here that the second symmetry plane associated with the manipulator or with the manipulator clamping elements and/or gripping elements does not imperatively have to extend through an approximately vertical rotational axis of the manipulator, since the manipulator is not necessarily designed to be rotationally symmetric, but it can rather also have an asymmetric design if this is appropriate in terms of construction and/or dynamics.

An asymmetric gripping or seizing of the piece goods in the manipulator can also be characterized, for example, in that the length in transport direction of the total of seized piece goods is less than the total length of the manipulator's gripping elements and/or clamping elements that are advanceable toward each other if the manipulator is aligned upon seizing the piece goods such that the longitudinal extension directions of the manipulator gripping elements and/or clamping elements are oriented approximately parallel to the transport direction, and such that a non-occupied length of the gripping elements and/or clamping elements of the manipulator at one end face of the piece goods is greater or smaller than at the oppositely located other end face. When the manipulator is symmetrically loaded, these non-occupied length measures, in contrast, approximately correspond.

It can furthermore be provided in the method, that in each instance at least one transported piece good is seized, in a plurality of temporally consecutive steps, in a clamping and/or form-locking and/or force-locking manner from the closed formation and/or from the cycled infeed; is in each instance spatially separated from the closed formation; and is brought into a particular specified relative target position and/or target alignment in relation to subsequent piece goods. The separation is carried out, for example, by distancing in transport direction; as the case may be, by an at least brief acceleration with a movement component parallel to the straight movement path of the closed formation and toward a particular specified relative target position and/or target alignment in relation to subsequent piece goods. In this context, the corresponding piece goods are brought into their particular target position and/or target alignment in a plurality of temporally consecutive steps, in which process a rotation of the piece goods seized by the manipulator can be carried out, if applicable, and thus a palletizable layer or a pre-group for a palletizable layer is formed, for example.

Because the picking off of piece goods from the closed and/or cycled formation of the piece good rows being conveyed to the seizing range is frequently carried out asynchronously, it is possible to define specific expedient restrictions regarding the movement patterns of the manipulator immediately following the picking off and seizing of piece goods from the formation. If the gripper head of the manipulator is loaded with piece goods in the described asymmetric manner or in so-called asynchronous loading, by which the distancing of the particular first or second symmetry planes is meant—these are the particular vertical symmetry planes that are oriented approximately perpendicular to the transport direction or to the longitudinal extension direction of the piece good formation—, not every rotation direction variant is expediently performable in the instance of a shift to the left or to the right, which shift can in each instance be overlapped by a rotation, if applicable, because this could possibly lead to an unnecessarily long shift path that the manipulator would altogether have to perform.

If the gripper head of the manipulator is briefly accelerated in transport direction immediately after seizing the piece goods, that is to say, immediately after picking off the foremost transported piece goods from the closed or cycled formation, whereby the picked-off piece goods obtain a sufficient safety distance from the subsequent piece goods of the closed or cycled formation, no risk of collision between the gripper head of the manipulator or the picked-off piece goods clamped therein and the subsequent piece goods of the closed or cycled formation will result upon an initiated rotation. If, however, this brief acceleration of the manipulator or of the gripper head, is dispensed with in the individual case for reasons of quicker positioning, the further direction of movement and, in particular, of rotation immediately after picking off is no longer to be selected arbitrarily, but rather has to take into consideration the impending risk of collision between the already seized piece goods or between the gripper head itself and the subsequent piece goods of the formation. In the instance of the seized piece goods being brought to the right side of the vertical parting plane or median plane defined by the transport direction and/or by the longitudinal extension direction of the formation, the manipulator or the gripper head expediently performs a right hand rotation, if the piece goods are not only to be shifted within the seizing range, but rather to be realigned as well in an overlapping rotation. Similarly, in the instance of the seized piece goods being brought to the left side of the vertical parting plane or median plane defined by the transport direction and/or by the longitudinal extension direction of the formation, the manipulator or the gripper head performs a left hand rotation, if the piece goods are not only to be shifted within the seizing range, but rather to be realigned as well in an overlapping rotation.

When the gripper head is loaded asynchronously, however, such left hand rotations or right hand rotations frequently lead to altogether longer distances that have to be covered by the gripper head or by the manipulator between the place of seizing and the target location or the target alignment of the shifted, positioned, and/or rotated piece goods, so that it can be more expedient to perform the described brief acceleration of the gripper head immediately after asynchronous loading with piece goods on the one hand, and to carry out a left hand rotation or a right hand rotation according to requirements on the other hand, independently of the main direction of shifting, positioning, and/or realigning the piece goods, that is to say, whether the main direction should be located on the left side or on the right side of the vertical parting plane or median plane. In particular in the instance of a shift to the left in relation to the vertical parting plane or median plane with a specified rotation angle of the seized piece goods by, for example, 90° in relation to the original transport direction of the formation, it can thus be expedient for the purpose of reducing the distances to be covered to have the gripper head perform this 90° rotation as a right hand rotation, whereby, however, the described brief acceleration becomes nearly indispensable due to the thus resulting risk of collision between the piece goods in the gripper head or between the gripper head itself and the subsequent piece goods of the formation.

This described preferred direction of rotation becomes particularly plausible if it is taken into account that the asynchronous loading leaves the reception capacity of the gripper head or of the manipulator that is located foremost in transport direction almost without exception unused, while the sections of the gripper head or of the manipulator succeeding in transport direction are filled with piece goods. It is generally possible to deviate from this rule, too, in practice, however, such exceptions will rarely occur.

Alternatively or additionally, the piece goods, having been brought into their particular target position and/or target alignment in temporally consecutive steps, are, in particular in the seizing range of at least one manipulator of the apparatus, formed into two or more rows of piece goods that are further processable and/or suppliable to a packaging station or that are palletizable each individually or together. In this context, individual, several, or all piece goods can each be rotated, in particular in each instance by a rotation angle of 90° about a vertical. This case is not the rule, however, but rather occurs less frequently, because it relates to an option that cannot be regarded as the rule, where, instead of one palletizable layer, two rows or more are formed, each under a 90° rotation of the piece goods. Nevertheless, this case can represent an expedient option in some special situations of layer formation and/or row formation.

For the purpose of forming the palletizable layer or the pre-group for a palletizable layer according to one embodiment of the invention, at least two piece goods are seized at least approximately simultaneously in at least one of the temporally consecutive steps. These at least two piece goods are subsequently spatially separated from the closed formation together, and are brought together into their particular specified relative target position and/or target alignment in relation to the subsequent piece goods of the formation. If the gripper head of the manipulator can receive three piece goods simultaneously, for example, the space located foremost in transport direction as a rule remains unused and free for a further piece good in the instance of an asynchronous loading or in the instance of an asynchronous picking off; and this induces the above described preferred movement directions and rotation directions of the manipulator in the following positioning and/or alignment within the seizing range.

For the purpose of forming the palletizable layer or the pre-group for a palletizable layer, normally or relatively frequently different numbers of piece goods are seized in at least two or more temporally consecutive steps in a clamping and/or force-locking and/or form-locking manner; are in each instance spatially separated from the closed formation; and are brought into a particular specified relative target position and/or target alignment in relation to subsequent piece goods, since the piece good arrangements or piece good assemblies to be formed as a rule do not allow a complete regularity in positioning and realignment. This method phase can form an important step in connection with the asymmetric seizing of piece goods or with the asynchronous picking off of piece goods. In this context it can be provided that first, a first number of piece goods is seized and transferred to the target positions, for example, only one piece good, two, three, or more piece goods, whereupon a further number that can be different from the first number is seized, transferred, and deposited or positioned there in the target positions.

For the purpose of forming the palletizable layer or the pre-group for a palletizable layer according to one embodiment of the invention, in each instance one individual piece good is seized in at least two or more temporally consecutive steps in a clamping and/or force-locking and/or form-locking manner; is in each instance spatially separated from the closed formation; and is brought into a particular specified relative target position and/or target alignment in relation to the subsequent piece goods of the formation. This exemplary embodiment is to be understood alternatively, as a modification and/or as an additional option to some of the previously described embodiment variants, and it particularly relates to the option of forming palletizable layers by picking off only one individual piece good each time.

In the described method, preferably, in the at least two temporally consecutive steps, in each instance one piece good that is transported foremost in the closed formation or a plurality of piece goods that are transported foremost in the closed formation is/are seized; is/are separated from the formation; and is/are repositioned by the at least one manipulator of the apparatus. As described above on the basis of the asymmetric loading or on the basis of the asynchronous picking off, the seizing of only one individual piece good implies a non-complete use of the reception capacity of the manipulator's gripper head, where, as a rule, the sections located foremost in transport direction remain unused, such that, under the additional condition of minimizing the distances to be covered by the gripper head, preferred rotation directions result when the piece goods are repositioned within the seizing range on their way to the particular target position and/or target alignment.

In the method, the at least two temporally consecutive steps can be carried out by way of a specific manipulator that is preferably designed as a delta kinematic robot. Optionally, the particular number of piece goods in the at least two temporally consecutive steps can each be seized in a clamping and/or form-locking and/or force-locking manner by at least two of the specific manipulator's clamping elements and/or gripping elements located opposite each other, and can be released after having been brought into the particular specified target position by the at least two clamping elements and/or gripping elements located opposite each other, in particular, by the at least two movable and, in particular, openable and closable clamping elements and/or gripping elements located opposite each other opening up. These clamping elements and/or gripping elements are formed as gripping jaws or the like, which are advanceable toward each other, for example, and which allow quick seizing, shifting, positioning, and releasing of the piece goods at the desired speed and with the desired positioning precision. Other manipulators can optionally be used, for example, such as are designed as gantry robots or as parts of such gantry robots. Other manipulators can be advantageously deployed, too, for example, such as are designed as multi-axis robots or as parts of such multi-axis robots.

It is preferably provided that in each instance non-seized piece goods of remaining piece goods moved in a row are further transported interruption-free and/or at unchanged transport speed during the seizing in a clamping and/or form-locking and/or force-locking manner, during the spatial separation, and/or during the transfer of the at least one piece good into a specified relative target position and/or target alignment.

In addition, the method can optionally or additionally provide that the at least one piece good can be further transported, without interruption and/or speed change and/or direction change, upon reaching or immediately after reaching its target position and/or target alignment.

According to an alternative embodiment of the invention, the seized piece goods, after having reached and/or assumed their target position and/or target alignment, can be further transported, preferably without interruption, however at a changed speed and/or with a changed transport direction, and can be fed to a packaging apparatus, a palletizing station, or other further processing apparatuses, for example.

In the particular manipulation step for reaching the target position and/or target alignment, at least one further velocity component and/or direction component in relation to a transport speed of the closed formation is imparted to the at least one seized piece good. This is particularly carried out in the seizing range of the manipulator of the apparatus. The change of velocity and/or direction is imparted to the at least one seized piece good, in particular, by the manipulator. The manipulator can additionally be designed for rotating the at least one seized piece good. The above-described gripper head, for example, is located at a swivel joint and can change the alignment of the piece goods seized between the clamping jaws via rotation by a specified angle of, for example, 90°.

The invention furthermore relates to an apparatus for handling piece goods moved in formation one after another in at least one row, which apparatus comprises at least one manipulator with clamping elements and/or gripping elements for handling piece goods and at least one transport device, by way of which immediately consecutive piece goods of the row are transported without or nearly without spaces as closed formation into a seizing range of the at least one manipulator. The at least one manipulator is typically/preferably designed for seizing and/or receiving at least one piece good of the formation within the manipulator seizing range in a clamping and/or form-locking and/or force-locking manner, as well as for separating and transferring the at least one piece good of the closed formation into a target position and/or target alignment within the manipulator seizing range. The manipulator can be designed, for example, as parallel kinematic robot or as part of such, in particular as tripod or gantry robot, multi-axis robot, etc. The manipulator has, for example, at least one gripper head with clamping jaws that are rigid, movable, and/or advanceable toward each other, between which clamping jaws the at least one piece good can be clamped and can thereby be accordingly moved to the target position.

As an alternative or in addition to the described features, the apparatus can comprise one or more features and/or characteristics of the previously described method. The method can likewise alternatively or additionally have individual or several features and/or characteristics of the described apparatus.

In this apparatus, the at least one manipulator can preferably have a specific reception capacity for a plurality of piece goods and can be controllable for seizing a particular specific number of piece goods for the plurality of steps in a manner in each instance coordinated to the palletizable layer or pre-group of a palletizable layer to be formed. For different positioning steps, the particular number of piece goods can either correspond to the reception capacity of the manipulator or can be less than the reception capacity. Even if the present description frequently refers to a maximum reception capacity of up to three piece goods per manipulator or per gripper head the mentioned deliberations nevertheless analogously apply to manipulators with smaller or greater maximum reception capacity.

For easier handling of the piece goods, it can be advantageous if the at least one manipulator has two clamping elements and/or gripping elements located opposite each other for the particular seizing of the specific number of piece goods and for the release of the particular specific number of piece goods in the target position and/or target alignment.

According to one embodiment of the invention, it is provided that the at least one manipulator or a part of the at least one manipulator, which part is designed for seizing piece goods, moves, when seizing the at least one piece good, at approximately the same speed or at the same speed in relation to the closed formation.

The apparatus comprises at least one horizontal conveying device that is driven preferably interruption-free, on which the at least one piece good reaches the target position and/or target alignment from the manipulator or from a part of the at least one manipulator, which part is designed for seizing piece goods. In the context of the present description, the horizontal conveying device is frequently defined in connection with the particular target positions for the piece goods. Therefore, in order to avoid ambiguity, the target position is frequently exactly defined, and its connection to the horizontal conveying device is described in the description. In this manner, it is clarified in some passages that the target positions and/or target alignments are normally reached by the positioning movements of the manipulator. This can either be carried out in a direct way. The final target positions can, however, also be reached indirectly, for example by piece goods that are seized by the manipulator being used as slider for already pre-positioned piece goods. Here, the manipulator also acts as positioning tool, however, by interposing seized piece goods that are subsequently likewise to be to be positioned.

According to one embodiment of the invention, the at least one manipulator or a part of the at least one manipulator provided for the transfer of the at least one piece good to the target position and/or target alignment moves at approximately the same speed or at the same speed as the at least one horizontal conveying device that is driven preferably interruption-free, upon a complete transfer of the at least one piece good to the target position and/or to the target alignment. This applies preferably at least while the piece good or piece goods are being seized and immediately before and after this moment, and this can also be referred to as "sync-up" of the manipulator to the moving piece goods of the formation.

According to one embodiment, the horizontal conveying device that is driven interruption-free immediately follows the at least one transport device in transport direction, and the speed of the at least one horizontal conveying device that is driven preferably interruption-free and the transport speed of the at least one transport device approximately or exactly correspond to one another. The at least one transport device can be formed, for example, by at least one supply belt or by a plurality of parallel supply belts that preferably lead immediately up to the horizontal conveying device and, in particular, form a first transport area. In the instance of supplying the piece goods in an at least largely unspaced formation, normally—and in contrast to the known prior art—no pre-grouping or cycle formation of the piece goods is carried out in the first transport area, but is rather carried out simultaneously with the positioning of piece goods—by seizing, shifting, and/or rotating, reaching the target positions and/or target alignments, and subsequent disengaging of the manipulator from the in each instance positioned and/or aligned piece goods—within the so-called grouping module, which is, in particular, formed by the horizontal conveying device and the at least one manipulator disposed above the horizontal conveying device. From the entire description it is thus clear that, in the instance of an unspaced supplying, a pre-grouping in the customary sense, as a procedure that can be clearly identified and/or distinguished from the procedure of layer formation, does not take place here at all, but rather dissolves into the course of movements between separating the particular piece goods from the formation and reaching the target positions.

BRIEF DESCRIPTION OF THE FIGURES

The same or equivalent elements of the invention are in each instance designated using identical reference characters. Furthermore and for the sake of clarity, only the reference characters relevant for describing the individual figures are used. It should be understood that drawings of the detailed description and specific examples of the embodiments of the apparatus and of the method according to the invention are intended for purposes of illustration only and are not intended to limit the scope of the invention or of the inventive idea.

FIGS. 1 and 3 to 8 schematically show a temporal procedure of a first embodiment variant of a method according to the invention for handling piece goods moved one after another in at least one row by a corresponding handling apparatus.

FIGS. 9 to 16 schematically show a temporal procedure of a second embodiment variant of a method according to the invention for handling piece goods by a corresponding handling apparatus, where the piece goods are moved in each instance one after another in spaced-apart rows, and where this corresponds to a cycled infeed of the piece goods or of the rows of piece goods.

Figure 1:
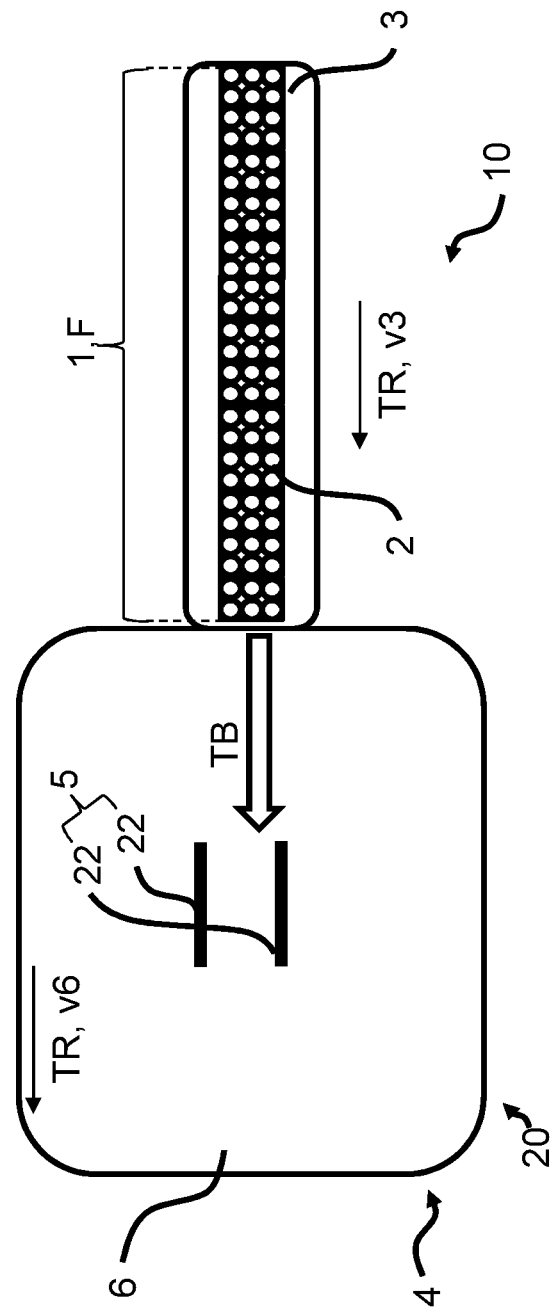

The same or equivalent elements of the invention are designated using identical reference characters. Furthermore and for the sake of clarity, only the reference characters relevant for describing the individual figures are provided. It should be understood that the detailed description and specific examples of the embodiments of the device and of the method according to the invention are intended for purposes of illustration only and are not intended to limit the scope of the invention.

DETAILED DESCRIPTION OF THE INVENTION

FIG. 1 particularly shows the piece goods 2 arriving via the transport device 3 of the handling apparatus 10 as row 1 or in essentially unspaced formation F. In the illustrated exemplary embodiment, the piece goods 2 are bundles, in each instance of six beverage containers, which are held together, for example, by a shrink wrap.

The piece goods 2 are moved in transport direction TR at a preferably constant transport speed v3 toward a seizing range 4 of a movable, shiftable, and/or rotatable manipulator 5 of the handling apparatus 10, and they are delivered, in particular, unspaced from the transport device 3 to the horizontal conveying device 6, and they continue to be guided thereon at a constant speed v6, which, in particular, corresponds to the transport speed v3 of the transport device 3.

The transport device 3 is, for example, a conveyor belt or another suitable conveying device on which the piece goods 2 are transported preferably in one row, where no or only a minor, possibly process-related space exists between in each instance directly consecutive piece goods 2. The piece goods 2 thus flow into the seizing range 4 of the movable, shiftable, and/or rotatable manipulator 5 in a so-called closed formation F.

It is furthermore possible that the piece goods 2 are transported to the seizing range 4 of the manipulator 5 in multiple rows, in particular in a plurality of parallel rows. The parallel rows can in this case be transported on the transport device 3 spaced apart from each other or largely without spaces from each other.

Furthermore illustrated in FIG. 1 is the movement path TB of the piece goods 2 arriving in formation F on the horizontal conveying device 6, which is located in alignment with the movement direction of the piece goods 2 on the transport device 3.

The horizontal conveying device 6 and the at least one manipulator 5 disposed above the horizontal conveying device 6 together are also referred to as grouping module 20 of the handling apparatus 10. The piece goods 2 are transferred, in particular unspaced, from the at least one transport device 3 into the grouping module 20 and constantly moved further along by the horizontal conveying device 6.

The manipulator 5, which is disposed above the horizontal conveying device 6 in the grouping module 20, is designed for receiving piece goods 2 in a clamping and/or force-locking and/or form-locking manner within the seizing range 4. The two piece goods 2 seized by the manipulator 5 are referred to below with the reference character 2* for the purpose of distinguishing them from the piece goods 2 disposed in the formation F. In a plurality of temporally consecutive steps, the manipulator 5 grips, for example, at least one, preferably at least two or three of the successively disposed piece goods 2, 2* arriving in closed formation F and at a constant transport speed v3; separates the piece goods 2, 2* from the single-row formation F of piece goods 2; and transfers the separated piece good 2* or the separated group of two or three piece goods 2* disposed unspaced in a row, into a target position P and/or a target alignment. In this case it can be provided that the piece good 2* or the group of piece goods 2* is laterally shifted in relation to the arriving formation F of piece goods 2, and/or that the seized piece good 2* or the seized group of piece goods 2* is spaced apart in transport direction TR from the formation F of piece goods 2 by the manipulator 5. It can be additionally provided in the method according to the invention that the piece good 2* or the group of piece goods 2* is rotated in relation to the piece goods 2 of the formation F.

During the positioning of the piece goods 2* seized by the manipulator 5, the at least one transport device 3 and the horizontal conveying device 6 continue to be operated constantly. In particular, the piece goods 2 of the formation F, as well as the piece goods 2* already disposed in the target position P, are transported further interruption-free and/or at unchanged transport speed v3 on the transport device 3 or at unchanged speed v6 on the horizontal conveying device 6.

Figure 2:
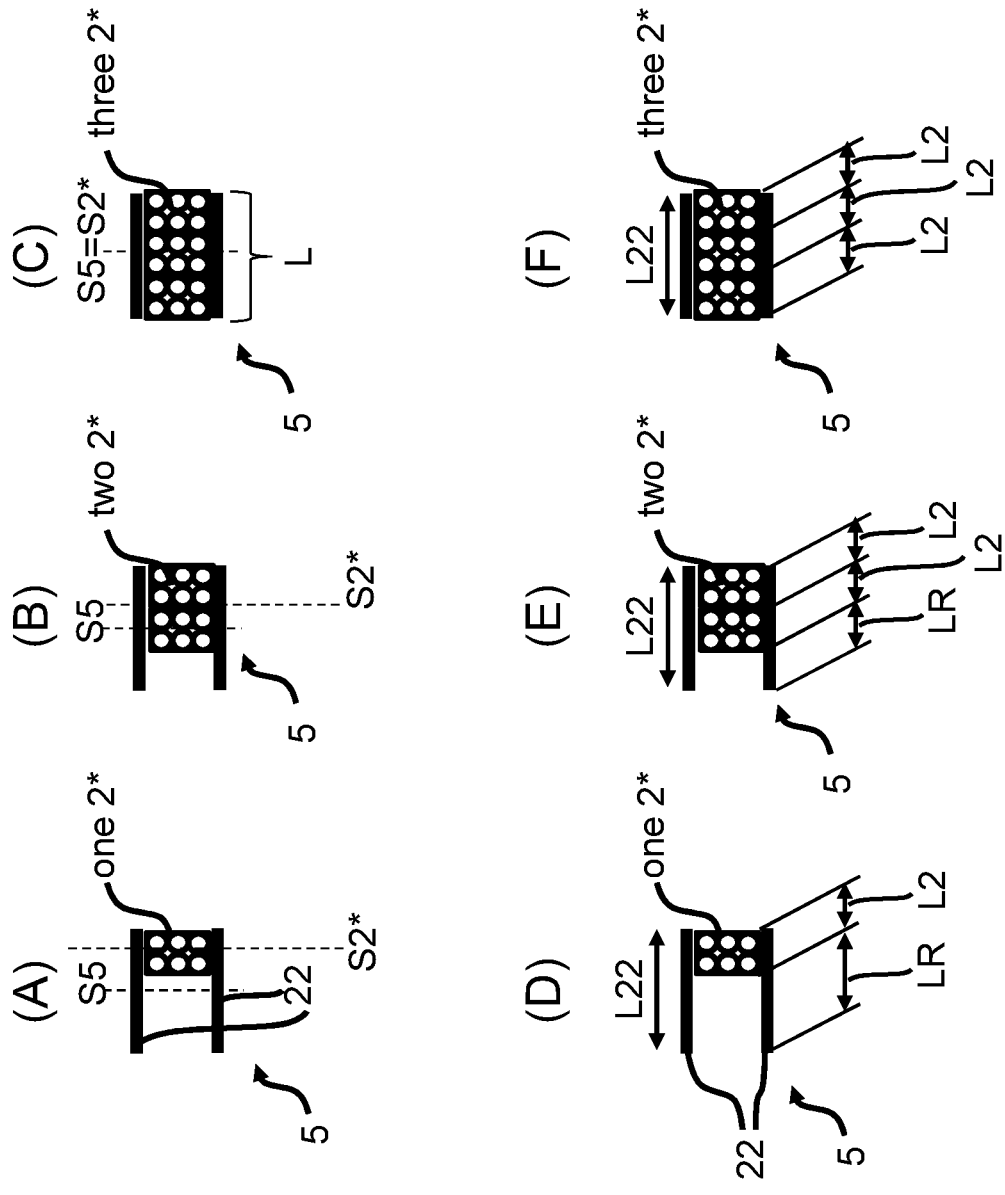
FIGS. 2A to 2C and the FIGS. 2D to 2F each show the seizing of a different number of piece goods by a manipulator of the handling apparatus.
Figure 3:
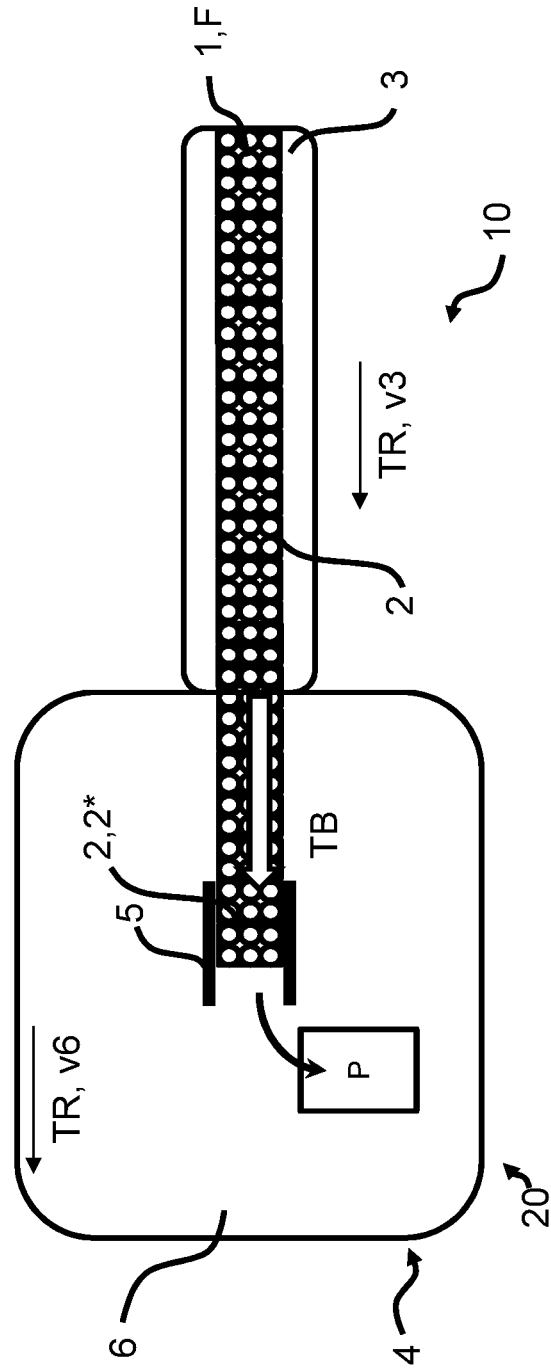
Figure 4:
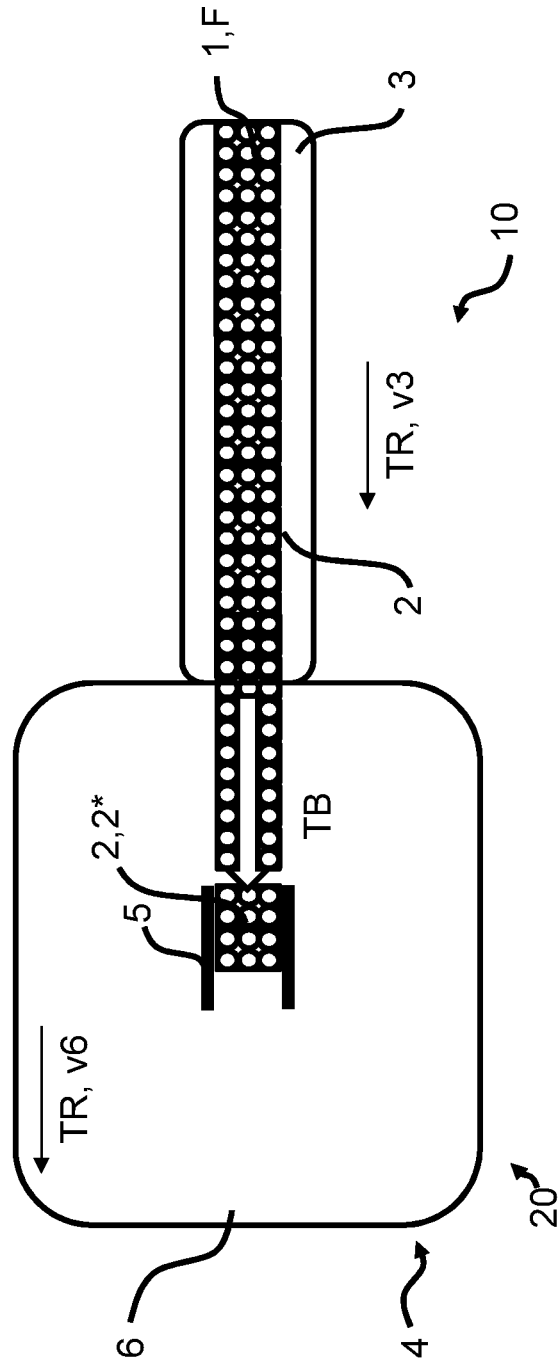
Figure 5:
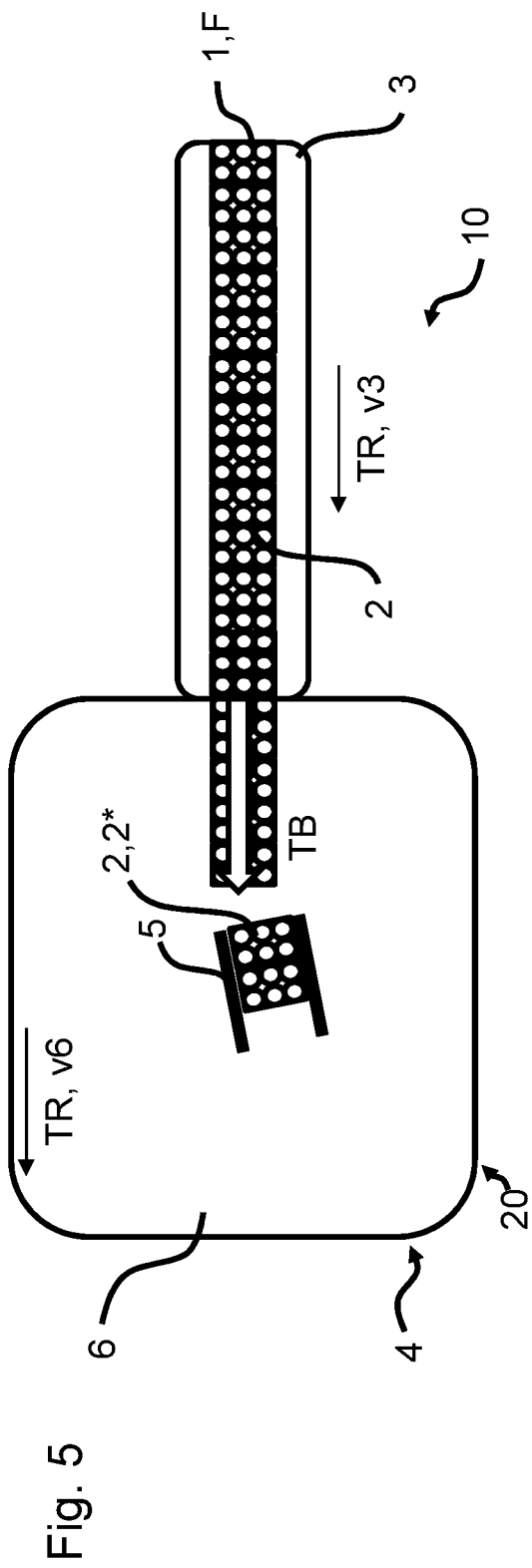
Figure 6:
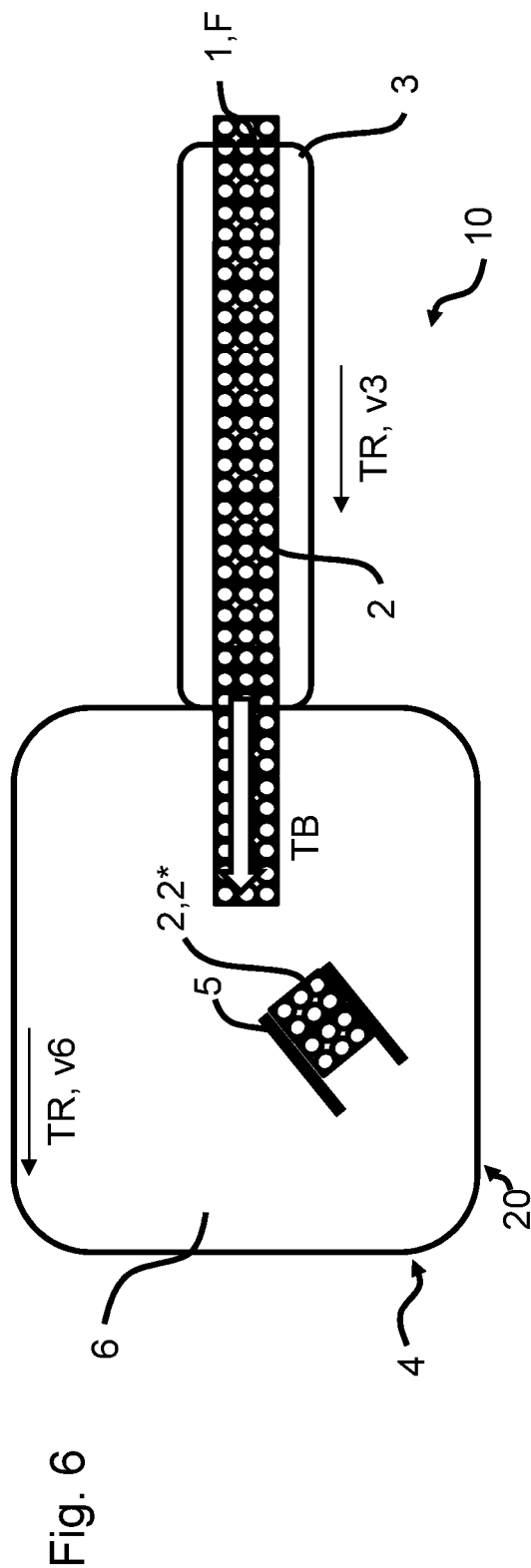
Figure 11:
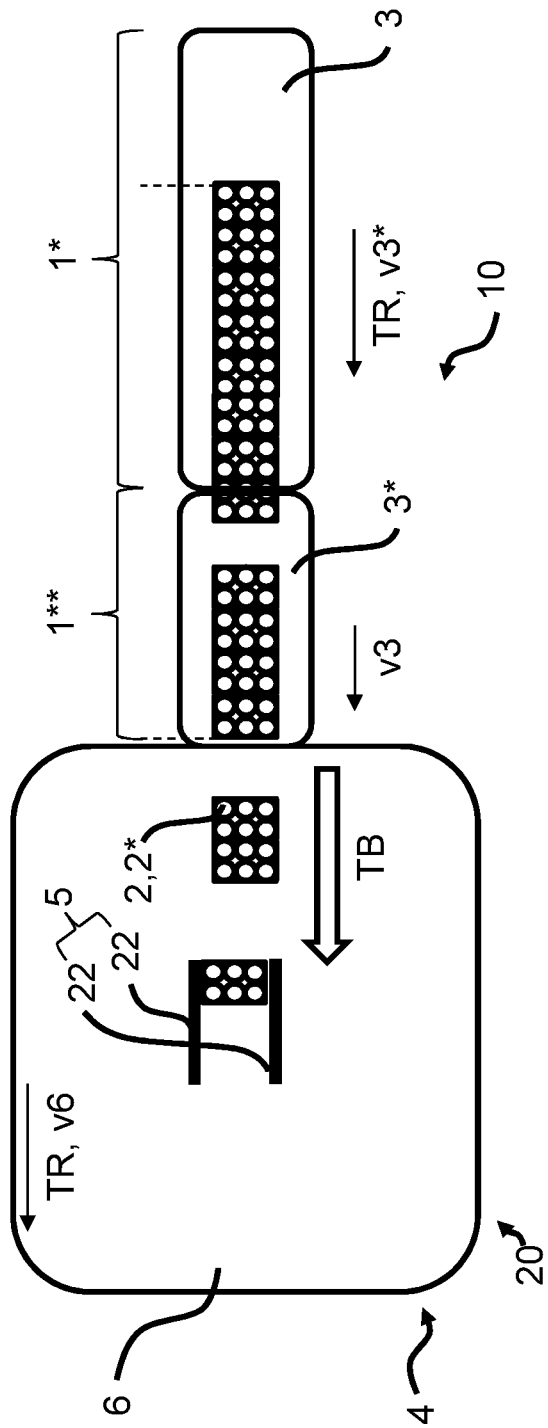
Figure 12:
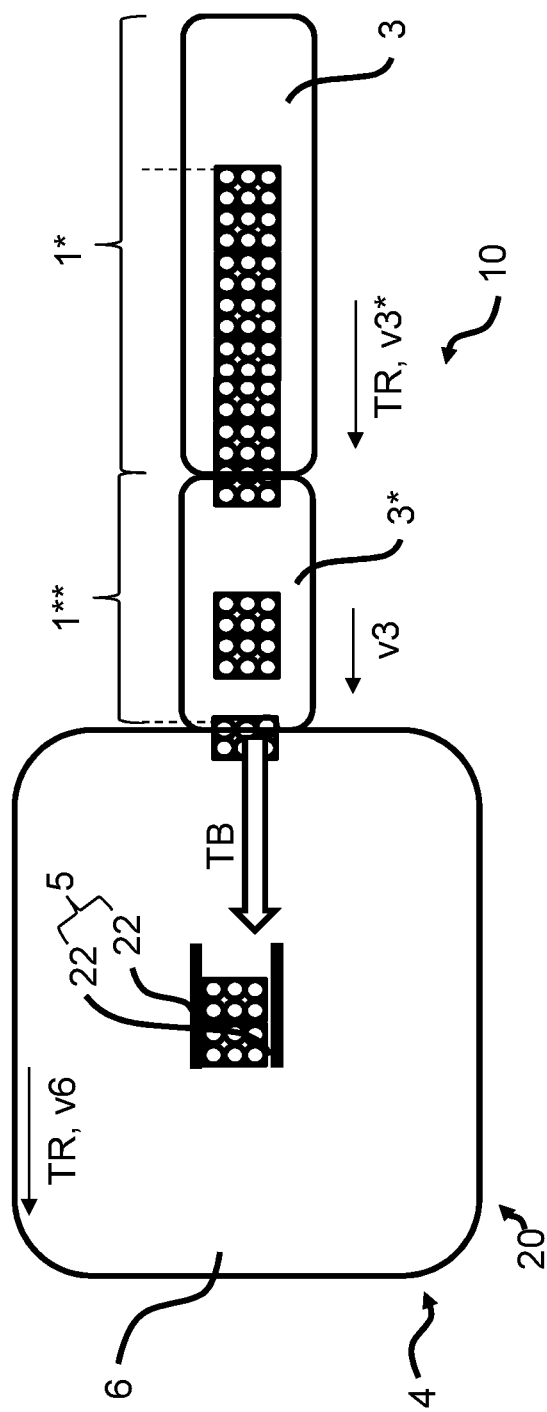

The manipulator 5 preferably has a specific reception capacity for a plurality of piece goods 2, 2* (cf. FIG. 2 and the corresponding description). It is, however, provided that the manipulator 5 in each instance seizes a specific number of piece goods 2 of the formation F in each method step, in each instance coordinated to the palletizable layer or the pre-group of a palletizable layer to be formed. This is controlled and/or regulated, in particular, by way of a control device (not illustrated). The number of seized piece goods in this context varies between one and the maximum number according to the reception capacity of the manipulator 5. Even if the description of the illustrated exemplary embodiments refers to a maximum reception capacity of up to three piece goods 2, 2* per manipulator 5 or per gripper head the mentioned deliberations nevertheless apply analogously to manipulators 5 with smaller or greater maximum reception capacity.

The FIGS. 3 to 8 show a first method step for handling piece goods 2 moved one after another in at least one row 1, for example when forming a palletizable layer or a pre-group for a palletizable layer from piece goods 2, where, in the illustrated method step, a picking off from the formation F of two piece goods 2 disposed foremost in the closed formation F is carried out by a manipulator 5 that has a maximum reception capacity of three piece goods. The piece goods 2 of row 1 that are not seized by the manipulator 5 are further transported in the seizing range 4 of the manipulator 5 without interruption and at unchanged speed v6.

In the first method step illustrated in the FIGS. 3 to 8, a group of two piece goods 2, 2*, which are gripped asymmetrically by the manipulator 5, is conveyed onto a target position P to the left of an alignment of the transport device 3 and is rotated in the process.

In this context, it can be provided that the manipulator 5 lifts up the two asymmetrically seized piece goods 2*, for example, conveys them to the target position P, and deposits them on the horizontal conveying device 6 within the seizing range 4. It can be alternatively provided that the manipulator 5 shifts the two piece goods 2* on the horizontal conveying device 6 by applying, in particular, a velocity component and/or a direction component to the piece goods 2* that have been picked off.

Preferably, the two asymmetrically seized piece goods 2* are in this context transferred, pushed, and in the process correspondingly rotated into the particular target position P and/or target alignment in one single, in particular, interruption-free manipulation step. In particular, the two asymmetrically seized piece goods 2* are brought into a position P such that the piece goods 2*, which have been manipulated and brought into particular target positions P in a plurality of temporally consecutive method steps, form a palletizable layer or a pre-group for a palletizable layer.

In the manipulation steps described here, it is particularly provided that the manipulator 5, at least during the asymmetric seizing of the two piece goods 2* and during their release in the target position P1 and target alignment, moves at a speed corresponding approximately or exactly to the transport speed v3 at which the closed formation F of the piece goods 2 is moving or corresponding to the speed v6 at which the horizontal conveying device is moving.

After the piece goods 2* have reached their target position P and the manipulator 5 has in each instance disengaged from the piece goods 2*, the piece goods 2* are further moved on the horizontal conveying device 6 in transport direction TR and at the speed v6. In particular, the particular target position P is a position relative to the subsequent piece goods 2, the positions of which were not changed by the manipulator 5. Since the speed v6 of the horizontal conveying device 6 corresponds to the transport speed v3 of the transport device 3 in the embodiment described here, and since the transport directions TR of the transport device 3 and of the horizontal conveying device 6 likewise correspond to each other, the piece goods 2*, with their positions and/or alignments having been changed by the manipulator 5, are further transported, without interruption and/or without speed change and/or direction change, upon or immediately after reaching their target position P.

In the illustrated exemplary embodiment, two piece goods 2 of the formation F are asymmetrically seized by the manipulator 5 and are transferred into a target position P, in which process the seized group of two piece goods is additionally rotated by 90°. In particular in connection with the disclosure of the FIG. 2 it is clear to the expert that, according to the design of the manipulator 5 and the arrangement of the manipulator 5 at the arriving closed formation F, different numbers of piece goods 2, 2* can also be seized in each instance in temporally different method steps.

The receiving position of the manipulator 5 is shifted according to the number of piece goods 2* to be picked off/divided off. The product groups required on the layer to be formed are thus formed during the manipulation step that unites a grouping process and a positioning process in one single method step.

The transport speed v3 of the transport device 3 or the speed v6 of the horizontal conveying device 6 is in this context selected such that the manipulator 5 has sufficient time, within its available operating range or seizing range 4 to shift and/or rotate the piece goods 2*. Preferentially, the manipulator 5 consists of a delta kinematic robot in order to realize highly dynamic shifting movements of the at least two temporally consecutive steps and to enable cycle times to be as fast as possible.

Prior to initiating a rotation of the manipulator 5, the manipulator 5 can be at least briefly accelerated together with the seized piece goods 2* in relation to the piece goods 2 of the formation F, for example, in order to separate the piece goods 2* seized by the manipulator 5 at least slightly from the subsequent piece goods 2 of the formation F.

In the method described here, the groups of piece goods 2* are assembled or formed according to the particular arrangement to be formed during the process of grouping/positioning. In particular, group formation and positioning is possible in one single method step and by one single appropriate apparatus (in particular by the movable, shiftable, and/or rotatable manipulator 5 as part of the apparatus). This is an essential difference to the prior art, where, for example by the arrangement of suitable conveying means, which are in each instance driven at different speeds, a group is formed first and is subsequently positioned and/or rotated in a further method step according to the layer to be formed.

If a manipulator 5 is generalizingly referred to in the present case or also generally in the context of the present invention and/or in the context of the exemplary embodiments described here on the basis of the FIGS. 1 to 16, this part of the manipulator 5 provided for the transfer of the at least one piece good 2, 2*, 2a to the target position P and/or target alignment, can concretely be, for example, a tool head, a gripper head, or the like, which is, for example, attached and mounted on movably mounted cantilever arms, which in turn can be typically mounted in a frame-fixed manner on a frame or the like. Such a manipulator suspension or manipulator arrangement, as the case may be—also known as parallel kinematic arrangement—enables the desired movability of the head (also: of the manipulator 5), which can seize, shift, position, place, rotate, etc. the piece goods 2, 2* in the desired manner for moving toward the particular target positions P and/or target alignments for the piece goods 2, 2*. Other suitable manipulator configurations are, however, equally conceivable, for example, such as are carried out with gantry robot guidings or the like. These other manipulator configurations can optionally relate to individual, several, or all embodiment variants mentioned in the context of the present description of figures and/or of the entire description of the invention.

FIGS. 2A to 2C show the seizing of a different number of piece goods 2, 2* by a manipulator 5 of the handling apparatus 10. The manipulator 5 preferably has a specific reception capacity for a plurality of piece goods 2, 2*. It is, however, provided that the manipulator 5 in each instance seizes a specific number of piece goods 2 of the formation F in each method step, in each instance coordinated to the palletizable layer or the pre-group of a palletizable layer to be formed. This is controlled and/or regulated, in particular, by way of a control device (not illustrated). The number of seized piece goods in this context varies between one and the maximum number according to the reception capacity of the manipulator 5.

The manipulator 5 schematically illustrated in the FIG. 2 is designed, for example, as gripper head and has two clamping elements and/or gripping elements that are rigid, movable, and/or advanceable toward each other and that are located opposite each other, in particular, two clamping jaws 22 or gripper paddles or the like, for receiving piece goods 2, 2* in a clamping and/or form-locking manner. Designed to take shape, preferably, between the clamping jaws 22, is a receiving opening, which can be reduced by an advance movement of the clamping jaws 22 toward each other, and which can be increased by a counter-movement of the clamping jaws 22 away from each other. The at least one piece good 2, 2* can be seized in a clamping and/or force-locking and/or form-locking manner between the clamping jaws 22 and can thereby be accordingly moved to the desired target position P (cf. FIG. 8). The length L of the clamping jaws 22 is selected such that a maximum number of piece goods 2* forming a cycle for the layer can be picked off. The manipulator 5 illustrated in the FIG. 2 can, in particular, seize one piece good 2* (cf. FIG. 2A), two piece goods 2* (cf. FIG. 2B), or three piece goods 2* (cf. FIG. 2C).

In this context, it can be provided that a first vertical symmetry plane S2*, which is defined by the at least one piece good 2*, which is seized by the at least two clamping jaws 22 of the at least one manipulator 5, is spaced apart from a second vertical symmetry plane S5, which is defined by the manipulator 5 or by the manipulator clamping jaws 22. In this way it can be defined, in particular, that the at least one piece good 2* seized by the manipulator 5 is not seized and positioned there centrally or symmetrically in relation to the vertical central axis and/or axis of rotation of the manipulator 5 or of the manipulator clamping jaws 22 while it is being shifted and/or brought toward the target position P, if applicable, under simultaneous rotation. This applies likewise to two or more seized piece goods 2*, which can also be clamped in the manipulator 5 eccentrically or asymmetrically. In this instance, it is also referred to an asymmetric or unsymmetrical loading of the manipulator.

FIGS. 2A and 2B show the asymmetric loading of a manipulator 5, which can seize up to three piece goods 2* between the clamping jaws 22. If the manipulator 5 is loaded with only one or two piece goods 2, the arrangement of the piece goods 2* is carried out eccentrically in relation to the clamping jaws 22, that is to say, the first vertical symmetry plane S2* is spaced apart from the second vertical symmetry plane S5 of the manipulator 5. If the manipulator 5 is, in contrast, completely loaded with three piece goods 2*, then the first vertical symmetry plane S2* and the second vertical symmetry plane S5 of the manipulator 5 coincide, as is illustrated in the FIG. 2C.

The FIGS. 2D, 2E, and 2F illustrate the same connection once more with other denominations and in the context of the following equations and inequations. Let L22 thus be the total length of the clamping jaws 22 of the manipulator 5. Let L2 be the length of a piece good 2 or 2* that is currently located between the clamping jaws 22. Let LR accordingly be the particular residual length or vacant length between the clamping jaws 22 of the manipulator 5 that is not occupied by piece goods 2 or 2*. The FIGS. 2D, 2E, and 2F together illustrate that with a clamping jaw length L22 corresponding to the threefold length of a piece good length L2, the general relation applies:

$$LR=(3-x)\cdot L2,$$

with x being the number of the piece goods 2* clamped in each instance between the clamping jaws 22, that is, currently located in the manipulator 5. Accordingly, with only one piece good located in the manipulator 5:

$$x=1,$$

this corresponding to the presentation both of FIG. 2A and FIG. 2D, the following special case applies:

$$LR=(3-x)\cdot L2=2\cdot L2$$

In a corresponding manner, with two piece goods located asymmetrically in the manipulator 5:

$$x=2,$$

this corresponding to the presentation both of FIG. 2B and FIG. 2E, the following special case applies:

$$LR=(3-x)\cdot L2=1\cdot L2=L2$$

In the special case shown in FIG. 2F of the symmetric loading of the manipulator 5 with a total of three piece goods 2*, (cf. FIG. 2C with the coinciding symmetry planes S2* and S5) the following consequently applies:

$$x=3,$$

whereof a value of zero is calculated for the residual length LR:

$$LR=(3-x)\cdot L2=0\cdot L2=0$$

The deliberations made in connection with the FIGS. 2A to 2F are generally based on an asymmetric loading of the manipulator 5 or, if applicable, on an asymmetric gripping, in which case the piece goods 2* located between the clamping jaws 22 are disposed at one edge of the clamping jaws 22 such that the non-occupied residual length LR only occurs on one side, not, however, on both sides of the piece goods 2* located between the clamping jaws 22. Therefore, it can be moreover determined that an asymmetric loading of the manipulator 5 or an asymmetric gripping exists if both of the following conditions apply:

$$L22 > x \cdot L2,$$

and $$LR \geq (L22 - x \cdot L2) \cdot \tfrac{1}{2},$$

where x can generally assume the values zero, one, two, or three, whereas x, in order to fulfill the above inequations with asymmetric loading or with asymmetric gripping, in the shown exemplary embodiment, may only assume the values one (x=1; cf. FIG. 2D) or two (x=2; cf. FIG. 2E), since otherwise, the manipulator 5 would be vacant (for x=0, not shown) or the manipulator 5 would be fully loaded and symmetrically loaded (for x=3; cf. FIG. 2F).

For the sake of completeness, it should be noted here that an instance of symmetric gripping with a non-fully-occupied manipulator 5 is conceivable such that between the clamping jaws 22, two piece goods 2* could be disposed centrally, for example, such that the particular symmetry planes S2* of the piece goods 2* and S5 of the manipulator 5 could also coincide. This instance is not representable in the above formulae, even though the above inequation (L22>x·L2) could apply. In such a gripping situation, however, the entire residual length LR would be distributed evenly to two edge sections between the clamping jaws 22 such that the lower inequation [LR≥(L22−x·L2)·½] would not be fulfilled.

The manipulator 5 or gripper head is designed for changing the speed and/or the direction of the at least one seized piece good 2, 2*. Furthermore, the manipulator 5 or gripper head can additionally be designed for rotating the at least one seized piece good 2, 2*. The above-described gripper head is located, for example, at a swivel joint, and it can change the alignment of the piece goods 2, 2* seized between the clamping jaws 22 via rotation by a specified angle of, for example, 90°.

After the at least one piece good 2, 2* seized by the manipulator 5 has reached its target position P (cf. FIG. 8), it is released by the at least two clamping elements and/or gripping elements located opposite each other opening up, in particular by the clamping jaws 22 opening up.

In the exemplary embodiments illustrated and described here, the part of the manipulator 5 provided for the transfer of the at least one piece good 2, 2* into the target position P and/or target alignment can be a gripper head, which is, for example, attached and mounted on movably mounted cantilever arms, which in turn are typically mounted in a frame-fixed manner on a frame or the like. Such a manipulator suspension or manipulator arrangement—also known as parallel kinematic arrangement—enables the desired movability of the gripper head, which can seize, shift, position, place, rotate, etc. the piece goods 2, 2* in the desired manner for moving toward the target positions P and/or target alignments for the piece goods 2, 2*.

Regarding the described rotary movements, it can be mentioned that the manipulator 5 or the manipulator gripper head can optionally rotate by a desired alignment angle for the piece goods 2 or 2* optionally, for example, by 45°, for example, by about 90°, or also by other rotation angles. An endless rotatability of the gripper head of the manipulator 5 can be particularly advantageous because in this way, a fast further rotation during the return movement to the formation F can be carried out in rotations, for example, by 180° or by 90°, where the further rotation possibly requires a shorter time than a return rotation in the opposite sense of rotation. By such an endless rotatability of the gripper head with, in principle, unlimited rotation angle, it is thus possible to always select the rotation directions that can be carried out faster in each particular case; this relates both to the positioning of the seized piece goods 2 or 2* and to "empty runs" in the return movements of the manipulator 5 toward the formation F in order to receive further piece goods 2 or at least one further piece good 2 there.

The possibility of seizing different numbers of piece goods 2, 2* in each instance in different method steps with the same manipulator 5 or gripper head, as applicable, makes it possible, in particular by an asymmetric receiving of piece goods 2, 2*, to divide off different groups of piece goods 2, 2* using one single manipulator 5 or gripper head, as applicable. This results in an increased variability of the apparatus 10; costs and storage space can moreover be saved, since it is then no longer necessary to provide appropriate manipulators 5 or gripper heads, as applicable, for each product. Since groups of piece goods can in each instance be picked off in the currently required number, it is potentially also possible to save method steps, whereby a higher throughput can be achieved.

On the basis of a further exemplary embodiment, the further FIGS. 9 to 16 illustrate a cycled infeed of the piece goods 2, which are conveyed to the horizontal conveying device 6 or to the seizing range 4 of the manipulator 5, as applicable, by a transport device 3 and a short transport section 3* following thereupon. The FIG. 9 thus shows, in particular, the arrival of the piece goods 2, as a finite row 1* of a specified length or with a specified number of piece goods 2, by way of the transport device 3 of the handling apparatus 10. In the illustrated exemplary embodiment, the piece goods 2 can be bundles, in each instance of six beverage containers, which are held together, for example, by a shrink wrap.

As is indicated in the FIGS. 9 to 16, the row 1*, which is shorter than the row 1 of the closed formation F as previously shown on the basis of the FIGS. 1 to 8, does not have to extend over the entire length of the transport device 3, but can rather cover only a number, for example, of a total of eight piece goods 2, and thus no longer forms a closed formation F as previously defined on the basis of the first exemplary embodiment according to FIGS. 1 to 8.

The piece goods 2 are first conveyed on the transport device 3 in transport direction TR at a preferably constant transport speed v3* toward a shorter transport section 3* immediately following the transport device, where they are accelerated to the faster transport speed v3, whereby groups of consecutive piece goods 2 of the row 1* are spaced apart such that shorter rows 1** of, for example, only four piece goods 2 are hereby formed, as is indicated in FIG. 9. The transport section 3* leads up to the horizontal conveying device 6 such that the piece goods 2 are moved from the transport section 3* into the seizing range 4 of the movable, shiftable, and/or rotatable manipulator 5 of the handling apparatus 10, and are delivered from the transport section 3* to the horizontal conveying device 6, in particular, with spaces of specified lengths between consecutive shorter rows 1** of piece goods 2, and are further conveyed on the horizontal conveying device 6 at a constant speed v6, with their constant speed v6 corresponding approximately to the transport speed v3 of the transport section 3*, which transport speed v3, in turn, is faster than the transport speed v3* of the transport device 3.

Both the transport device 3 and the transport section 3* are each formed, for example, by conveyor belts or other suitable conveying devices on which the piece goods 2 are transported preferably in one row, where no or only minor, possibly process-related spaces exist within the particular rows 1\* or **1\*\*, as applicable, between in each instance directly consecutive piece goods 2. The piece goods 2 thus arrive in the seizing range 4 of the movable, shiftable, and/or rotatable manipulator 5 in groups or rows 1\* or 1\*\* in each instance with a particular, specified number of piece goods 2**.

It is optionally possible as well that the piece goods 2 are transported to the seizing range 4 of the manipulator 5 in multiple rows, in particular in a plurality of parallel rows. The parallel rows can in this case be transported on the transport device 3 spaced apart from each other or largely without spaces from each other. Such a variant is, however, not shown in the FIGS. 9 to 16.

Furthermore illustrated in FIG. 9, as well as in the following FIGS. 10 to 16, is the movement path TB of the piece goods 2 arriving in the short row **1\*\* on the horizontal conveying device 6, which is located in alignment with the movement direction of the piece goods 2 on the transport device 3 and on the transport section 3\***.

The horizontal conveying device 6 and the at least one manipulator 5 disposed above the horizontal conveying device 6 can, in their interaction with one another, also be referred to as grouping module 20 of the handling apparatus 10. The piece goods 2 are transferred from the transport section 3\* following the transport device 3 into the grouping module 20, in particular, with spaces of specified length between consecutive rows **1\*\* and thus in specified cycling, and are moved further along in the transport direction TR constantly at the conveying speed v6 by the horizontal conveying device 6**.

The manipulator 5, which is disposed above the horizontal conveying device 6 in the grouping module 20, is designed for receiving piece goods 2 in a clamping and/or force-locking and/or form-locking manner within the seizing range 4. The piece goods 2 seized by the manipulator 5 are referred to below with the reference character 2\* for the purpose of distinguishing them from the piece goods 2 disposed in the rows 1\* or **1\*\*, as applicable. In a plurality of temporally consecutive steps, the manipulator 5 grips, for example, at least one, optionally also two or three of the successively disposed piece goods 2, 2\* arriving in the row 1\*\* and at a constant transport speed v3; separates the piece goods 2 from the single-row row 1\*\* of piece goods 2; and transfers the separated piece good 2\* or the separated group of two or three piece goods 2\* disposed unspaced in a row, into a target position P and/or into a target alignment. In this case it can be provided that the piece good 2\* or the group of piece goods 2\* is laterally shifted in relation to the arriving row 1\*\* with further piece goods 2, and/or that the seized piece good 2\* or the seized group of piece goods 2\* is spaced apart in transport direction TR from the succeeding row 1\*\* of piece goods 2 by the manipulator 5. It can be additionally provided in the method according to the invention that the piece good 2\* or the group of piece goods 2\* is rotated in relation to the piece goods 2 of the row 1\*\***.

During the positioning of the piece goods 2\* seized by the manipulator 5, the transport device 3, the transport section 3\*, and the horizontal conveying device 6 continue to be operated constantly. In particular, the piece goods 2 of the rows 1\* and **1\*\*, as well as the piece goods 2\* already disposed in the target position P, are transported further interruption-free and/or at unchanged transport speed v3 on the transport section 3\* or at unchanged speed v6 on the horizontal conveying device 6**.

The manipulator 5 preferably has a specific reception capacity for a plurality of piece goods 2, 2\* (cf. FIG. 2 and the corresponding description). In addition, however, it is provided that the manipulator 5 in each instance seizes a specific number of piece goods 2 of the row **1\*\* of specified length in each method step, in each instance coordinated to the palletizable layer or the pre-group of a palletizable layer to be formed. This is controlled and/or regulated, in particular, by way of a control device (not illustrated). The number of seized piece goods 2 or 2\* in this context varies between one and the maximum number according to the reception capacity of the manipulator 5**.

The FIGS. 10 to 16 show a second embodiment variant—which differs from the first exemplary embodiment essentially by the cycled infeed—of the method for handling piece goods 2 moved one after another in at least one row 1\* or **1\*\* in different method steps, for example when forming a palletizable layer or a pre-group for a palletizable layer from piece goods 2, where, in the illustrated method steps, a picking off of one or two piece goods 2 disposed foremost in the row 1\*\* is carried out by a manipulator 5 that has a maximum reception capacity of three piece goods 2 or 2\*. The piece goods 2 of row 1\*\* that are not seized by the manipulator 5 are further transported in the seizing range 4 of the manipulator 5 without interruption and at unchanged speed v6**.

In the method steps exemplarily illustrated in the FIGS. 9 to 16, different groups of only one piece good 2 (FIG. 11) or of two piece goods 2, 2\*, which are gripped asymmetrically by the manipulator 5, are conveyed in each instance onto different target positions, in particular to the right of an alignment of the transport device 3, they are, however, not simultaneously rotated in the process (cf. FIG. 13 *ff*). In this context, it can be optionally provided that the manipulator 5 lifts up the two asymmetrically seized piece goods 2\*, for example, conveys them to the particular target position, and deposits them on the horizontal conveying device 6 within the seizing range 4. It can be alternatively provided that the manipulator 5 shifts the two piece goods 2\* on the horizontal conveying device 6 by applying, in particular, a velocity component and/or a direction component to the piece goods 2\* that have been picked off.

Preferably, the two asymmetrically seized piece goods 2\* are in this context transferred, pushed, and in the process correspondingly rotated into the particular target position and/or target alignment in one single, in particular, interruption-free manipulation step. In particular, the two asymmetrically seized piece goods 2\* are brought into a position such that the piece goods 2\*, which have been manipulated and brought into particular target positions in a plurality of temporally consecutive method steps, form a palletizable layer or a pre-group for a palletizable layer.

In the manipulation steps described here, it is particularly provided that the manipulator 5, at least during the asymmetric seizing of the two piece goods 2\* and during their release in the target position and target alignment, moves at a speed corresponding approximately or exactly to the transport speed v3 at which the row **1\*\* of the piece goods 2 moves after being accelerated with the takeover onto the transport section 3\* or corresponding to the speed v6 at which the horizontal conveying device 6** is moving.

After the piece goods 2\* have reached their particular target position and the manipulator 5 has in each instance disengaged from the piece goods 2\*, the piece goods 2\* are further moved on the horizontal conveying device 6 in transport direction TR and at the speed v6. In particular, the particular target position is a position relative to the subsequent piece goods 2, the positions of which were not changed by the manipulator 5. Since the speed v6 of the horizontal conveying device 6 corresponds to the transport speed v3* of the transport section 3* in the embodiment described here, and since the transport directions TR of the transport device 3, of the transport section 3*, and of the horizontal conveying device 6 likewise correspond to each other, the piece goods 2*, with their positions and/or alignments having been changed by the manipulator 5, are further transported, without interruption and/or without speed change and/or direction change, upon or immediately after reaching their target position.

The receiving position of the manipulator 5 can be shifted according to the number of the piece goods 2* to be picked off/divided off and/or the manipulator 5 can be activated according to the positions of the piece goods 2* to be seized. The product groups required on the layer to be formed are thus formed during the manipulation step that unites a grouping process and a positioning process in one single method step.

The transport speed v3 of the transport section 3* or the speed v6 of the horizontal conveying device 6 are in this context selected such that the manipulator 5 has sufficient time, within its available operating range or seizing range 4 to shift and/or rotate the piece goods 2*. Preferentially, the manipulator 5 consists of a delta kinematic robot in order to realize highly dynamic shifting movements of the at least two temporally consecutive steps and to enable cycle times to be as fast as possible.

Prior to initiating the rotation of the manipulator 5, the manipulator 5 can be at least briefly accelerated together with the seized piece goods 2* in relation to the piece goods 2 of the row 1**, for example, in order to separate the piece goods 2* seized by the manipulator 5 at least slightly from the subsequent piece goods 2 of the row 1**.

In the exemplary embodiment of the method described here, the groups of piece goods 2* are assembled or formed according to the particular arrangement to be formed during the process of grouping/positioning. In particular, group formation and positioning is possible in one single method step and by one single appropriate apparatus (in particular by the movable, shiftable, and/or rotatable manipulator 5 as part of the apparatus). This is an essential difference to the prior art, where, for example by the arrangement of suitable conveyor, which are in each instance driven at different speeds, a group is formed first and is subsequently positioned and/or rotated in a further method step according to the layer to be formed.

The invention has been described with reference to a preferred embodiment. Those skilled in the art will appreciate that numerous changes and modifications can be made to the preferred embodiments of the invention and that such changes and modifications can be made without departing from the spirit of the invention. It is therefore intended that the appended claims cover all such equivalent variations as fall within the true spirit and scope of the invention.

LIST OF REFERENCE CHARACTERS 1, 1*, 1** Row
2, 2* Piece good
3 Transport device
3* Transport section
4 Seizing range
5 Manipulator
6 Horizontal conveying device
10 Handling apparatus
20 Grouping module
22 Clamping jaws
F Formation
L, L2; L22, LR Length
P Target position
S2*, S5 Symmetry plane
TB Movement path
TR Transport direction
v3, v3* Transport speed
v6 Speed

The invention claimed is:

1. A method for handling piece goods (2) moved one after another, comprising:
transporting piece goods (2) to a seizing range (4) of a manipulator (5), wherein
seizing at least one transported piece good (2) or a group of at least two transported piece goods (2) from an unspaced succession as a closed formation (F), in the seizing range (4) in a clamping or force-locking or form-locking manner by at least two clamping devices or grippers (22) located opposite each other and assigned to the at least one manipulator (5);
spatially separating the seized piece good (2) or the group of at least two piece goods (2) from subsequent piece goods (2) of the closed formation (F); and
transferring the at least one separated piece good (2) into a specified relative target position (P) or target alignment in relation to subsequent piece goods (2) of the closed formation (F);
wherein one first vertical symmetry plane (S2*), which is defined by the at least one piece good (2) seized by the at least two clamping devices or grippers of the at least one manipulator (5), and which is oriented about perpendicular to a transport direction (TR) of the piece goods (2), is spaced apart from a second vertical symmetry plane (S5) aligned about parallel thereto, with the second vertical symmetry plane (S5) being defined by the manipulator (5) or by the manipulator clamping devices or grippers (22).

2. The method of claim 1, further comprising:
repeatedly seizing one transported piece good (2) or a group of at least two transported piece goods (2) from the closed formation (F) in a plurality of temporally consecutive steps and then transferring the one seized piece goods(2) or a group of at least two seized piece goods (2) into a particular specified relative target position (P) or target alignment in relation to subsequent piece goods (2) of the closed formation (F), and forming a palletizable layer or a pre-group for a palletizable layer from the piece goods (2),
wherein individual, a plurality of, or all piece goods (2) are rotated by a rotation angle of at least 90° about a vertical axis.

3. The method of claim 2, wherein the seizing step comprises seizing at least two piece goods (2) from the closed formation (F) at least approximately simultaneously.

4. The method claim 2, wherein the seizing step comprises seizing a different number of piece goods (2) each from the closed formation (F) in at least two or more temporally consecutive steps.

5. The method of claim 2, wherein the seizing step comprises seizing at least one individual piece good (2) each from the closed formation (F) in at least two or more temporally consecutive steps.

6. The method of claim 2, wherein the seizing step comprises seizing one foremost transported piece good (2) each or a plurality of foremost transported piece goods (2)

of a plurality of transported piece goods (2) from the closed formation (F) in the at least two temporally consecutive steps.

7. The method claim 6, wherein the seizing step comprises seizing the piece goods (2) from the closed formation (F) with a manipulator (5) comprising a kinematic robot (42) or a part of a delta kinematic robot (42).

8. The method of claim 7, wherein the seizing step comprises seizing the piece goods (2) from the closed formation (F) in a clamping or force-locking or form-locking manner in each case by at least two movable manipulator (5) clamping devices or grippers (22) located opposite each other, and wherein, after having been brought into their particular specified target position (P), releasing the piece goods (2).

9. The method of claim 8, further comprising further transporting the non-seized piece goods (2) of the closed formation (F) interruption-free or at unchanged transport speed during the seizing step, during the spatial separating step, or during the transferring step.

10. The method of claim 9, further comprising further transporting the at least one seized piece good (2), without interruption or without speed change or direction change, upon or immediately after reaching its target position (P) or target alignment.

11. The method of claim 10, wherein the separating step comprises imparting to the at least one piece good (2) seized from the closed formation (F) at least one further velocity component or direction component relative to a transport speed (v3) of the at least one seized piece good (2).

12. The method of claim 1, further comprising:
repeatedly seizing one transported piece good (2) or a group of at least two transported piece goods (2) from the closed formation (F) in a plurality of temporally consecutive steps and then transferring the one seized piece goods(2) or a group of at least two seized piece goods (2) into a particular specified relative target position (P) or target alignment in relation to subsequent piece goods (2) of the closed formation (F), and further processing or supplying two or more rows of piece goods (2) a packaging station or palletizing the piece goods (2),
wherein individual, a plurality of, or all piece goods (2) are rotated by a rotation angle of at least 90° about a vertical axis.

13. An apparatus (10) for handling piece goods (2) moved one after another, the apparatus (10) comprising:
at least one manipulator (5) with clamping devices or grippers (22) for handling piece goods (2);
at least one transport device by which consecutive piece goods (2) are transportable in an unspaced succession as a closed formation (F) into a seizing range (4) of the at least one manipulator (5),
wherein the at least one manipulator (5) seizes one piece good (2) or a group of at least two piece goods (2) in a clamping or force-locking or form-locking manner, and separates the piece good (2) or the group of piece goods (2) from the piece goods (2) of the closed formation (F) and transfers the seized piece good (2) or the seized group of piece goods (2) to a target position (P) or target alignment;
and wherein a first vertical symmetry plane (S2*) is spaced apart from a second vertical symmetry plane (S5) aligned about parallel thereto,
wherein the first vertical symmetry plane (S2*) is about perpendicular to a transport direction (TR) and defined by defined by the seized piece good (2) or the seized group of piece goods (2), and
wherein the second vertical symmetry plane (S5) is defined by the manipulator (5) or by the manipulator clamping devices or grippers (22).

14. The apparatus (10) of claim 13, wherein the at least one manipulator (5) is capable of performing a plurality of temporally consecutive steps, wherein, in each consecutive step, the manipulator (5) seizes one piece good (2) or a group of at least two piece goods (2) and separates the one seized piece good (2) or a group of at least two piece goods (2) from the subsequent piece goods (2) of the closed formation (F), and transfers the separated piece good (2) or a group of at least two separated piece goods (2) into a particular target position (P) or target alignment.

15. The apparatus (10) of claim 14, wherein the at least one manipulator (5) has at least two movable or openable and closable, clamping devices or grippers (22) located opposite each other.

16. The apparatus (10) claim 15, wherein the at least one manipulator (5) is capable of rotating individual, a plurality of, or all piece goods (2) about a vertical axis and through a rotation angle of at least 90°.

17. The apparatus (10) of claim 16, wherein the at least one manipulator (5) comprises a delta kinematic robot (42) or as a part thereof.

18. The apparatus (10) of claim 17, further comprising at least one horizontal conveying device (6) that is driven interruption-free, on which the at least one piece good (2) is transported to the target position or target alignment.

19. The apparatus (10) of claim 18, wherein the at least one horizontal conveying device (6) has a speed (v6) that approximately corresponds or exactly corresponds to the transport speed (v3) of the transport device (3).

* * * * *